US012235606B2

(12) United States Patent
Tanaka et al.

(10) Patent No.: US 12,235,606 B2
(45) Date of Patent: Feb. 25, 2025

(54) PROCESS CARTRIDGE

(71) Applicant: CANON KABUSHIKI KAISHA, Tokyo (JP)

(72) Inventors: Masatake Tanaka, Kanagawa (JP); Tomoya Uesugi, Shizuoka (JP); Shintaro Kawaguchi, Kanagawa (JP); Masamichi Sato, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 668 days.

(21) Appl. No.: 17/480,797

(22) Filed: Sep. 21, 2021

(65) Prior Publication Data

US 2022/0100113 A1 Mar. 31, 2022

(30) Foreign Application Priority Data

Sep. 28, 2020 (JP) ................................ 2020-162164

(51) Int. Cl.
*G03G 9/097* (2006.01)
*G03G 9/08* (2006.01)
*G03G 15/08* (2006.01)
*G03G 21/18* (2006.01)

(52) U.S. Cl.
CPC ....... *G03G 9/09725* (2013.01); *G03G 9/0819* (2013.01); *G03G 15/0808* (2013.01); *G03G 21/1814* (2013.01)

(58) Field of Classification Search
CPC ............. G03G 9/09725; G03G 9/0819; G03G 15/0808; G03G 21/1814
See application file for complete search history.

(56) References Cited

U.S. PATENT DOCUMENTS

| | | | |
|---|---|---|---|
| 3,993,483 | A | 11/1976 | Maki et al. |
| 5,194,353 | A | 3/1993 | Tanaka et al. |
| 5,246,807 | A | 9/1993 | Kanemaru et al. |
| 5,453,342 | A | 9/1995 | Go et al. |
| 5,464,718 | A | 11/1995 | Kashizaki et al. |
| 5,527,653 | A | 6/1996 | Tanaka |

(Continued)

FOREIGN PATENT DOCUMENTS

| | | | |
|---|---|---|---|
| CN | 101669073 | A | 3/2010 |
| CN | 106054546 | A | 10/2016 |

(Continued)

*Primary Examiner* — Peter L Vajda
*Assistant Examiner* — Boone Alexander Evans
(74) *Attorney, Agent, or Firm* — VENABLE LLP

(57) ABSTRACT

A process cartridge includes a photosensitive member, a toner, and a developing roller, a surface layer of the photosensitive member has a Martens hardness of 245 to 300 $N/mm^2$, the developing roller has a single-layered surface layer containing a substrate and a binder resin; when an elastic modulus of the binder resin in a first region is E1, and an elastic modulus of the binder resin in a second region is E2, $E1 \geq 200$ MPa and $10\ MPa \leq E2 \leq 150$ MPa are satisfied; the elastic modulus in the second region continuously decreases from that in the first region; the toner comprises a toner particle and an external additive A; the external additive A is a silica particle having a major diameter of 40 to 400 nm; and a coverage of the external additive A with respect to surface of the toner particle is 5.0% or more.

7 Claims, 4 Drawing Sheets

(56) References Cited

U.S. PATENT DOCUMENTS

| | | | |
|---|---|---|---|
| 5,629,116 A | 5/1997 | Kashizaki et al. | |
| 5,666,589 A | 9/1997 | Yoshinaga et al. | |
| 5,811,212 A | 9/1998 | Tanaka | |
| 5,818,489 A | 10/1998 | Yoshinaga et al. | |
| 5,885,737 A | 3/1999 | Tanaka | |
| 5,932,722 A | 8/1999 | Hirai et al. | |
| 6,040,100 A | 3/2000 | Tanaka et al. | |
| 6,139,997 A | 10/2000 | Tanaka et al. | |
| 6,183,922 B1 | 2/2001 | Takai et al. | |
| 6,190,811 B1 | 2/2001 | Tanaka et al. | |
| 6,218,063 B1 | 4/2001 | Tanaka et al. | |
| 6,245,472 B1 | 6/2001 | Tanaka | |
| 6,248,490 B1 | 6/2001 | Suzuki et al. | |
| 6,270,936 B1 | 8/2001 | Tanaka et al. | |
| 6,335,132 B1 | 1/2002 | Tanaka et al. | |
| 6,472,524 B2 | 10/2002 | Tanaka | |
| 6,683,175 B2 | 1/2004 | Tanaka | |
| 6,773,856 B2 | 8/2004 | Tanaka et al. | |
| 6,833,227 B2 | 12/2004 | Tanaka | |
| 7,245,851 B2 | 7/2007 | Fujii et al. | |
| 7,276,318 B2 | 10/2007 | Fujii et al. | |
| 7,517,626 B2 | 4/2009 | Fujii et al. | |
| 8,837,985 B2 | 9/2014 | Ishida et al. | |
| 8,846,287 B2 | 9/2014 | Yamada et al. | |
| 9,017,239 B2 | 4/2015 | Ishida et al. | |
| 9,436,151 B2 * | 9/2016 | Hayashi | G03G 5/14786 |
| 10,031,438 B2 | 7/2018 | Wakabayashi et al. | |
| 10,545,453 B2 | 1/2020 | Iwasaki et al. | |
| 10,942,471 B2 | 3/2021 | Ogawa et al. | |
| 2006/0024600 A1 | 2/2006 | Sugiura | |
| 2007/0190443 A1 | 8/2007 | Hagi et al. | |
| 2009/0041499 A1 | 2/2009 | Sato et al. | |
| 2013/0130022 A1 | 5/2013 | Uesugi et al. | |
| 2015/0248101 A1 | 9/2015 | Hayashi | |
| 2016/0299446 A1 * | 10/2016 | Kuroki | G03G 9/0825 |
| 2017/0329246 A1 * | 11/2017 | Yamawaki | G03G 9/08711 |
| 2019/0163118 A1 * | 5/2019 | Iwasaki | G03G 5/14795 |
| 2019/0369529 A1 | 12/2019 | Yagi et al. | |
| 2020/0004170 A1 | 1/2020 | Ishii et al. | |
| 2020/0166866 A1 | 5/2020 | Moriai | |

FOREIGN PATENT DOCUMENTS

| | | |
|---|---|---|
| CN | 109870886 A | 6/2019 |
| CN | 110658699 A | 1/2020 |
| EP | 3 588 194 A1 | 1/2020 |
| JP | 2007-171666 A | 7/2007 |
| JP | 2014-197064 A | 10/2014 |
| JP | 2017-49282 A | 3/2017 |
| JP | 2019-95679 A | 6/2019 |
| JP | 2019-95784 A | 6/2019 |
| JP | 2020-91473 A | 6/2020 |

* cited by examiner

PROCESS CARTRIDGE

BACKGROUND OF THE INVENTION

Field of the Invention

The present invention relates to a process cartridge.

Description of the Related Art

In an electrophotographic image forming apparatus (hereinafter, also referred to as an "electrophotographic apparatus"), an electrophotographic photosensitive member (hereinafter, also referred to as a "photosensitive member") is charged by a charging unit, and an electrostatic latent image is formed by a laser. Next, a toner in a developing container is applied onto a developing roller by a toner-supplying roller and a toner regulating member, and development with the toner is performed in contact with or in proximity to the photosensitive member and the developing roller. Thereafter, the toner on the photosensitive member is transferred to a recording paper by a transfer unit and fixed by heat and pressure, and the toner remaining on the photosensitive member is removed by a cleaning member.

Such an electrophotographic apparatus has been required to have higher image quality and durability, and a faster printing speed than ever before. For this reason, performance requirements for electrophotographic members such as developing rollers and toners are also becoming more sophisticated.

As an example, a case where the durability of the electrophotographic apparatus becomes extremely long is considered. In a conventional electrophotographic member, the surface thereof may be scraped by repeated circumferential rubbing to cause scratches, so that significant filming associated with fixation and deposition of a toner and an external additive component thereof may occur. In the conventional toner, an external additive or the like on the surface may be buried or detached by repeated circumferential rubbing, so that charging performance may be deteriorated. Such deterioration of members and toner due to repeated circumferential rubbing is problematic since the deterioration occurs in an actual image as an image adverse effect, and a technique for suppressing the deterioration in durability has been proposed so far.

Japanese Patent Application Laid-Open No. 2007-171666 proposes a method of adding large-diameter inorganic fine particle having a particle diameter of about several hundred nanometers, particularly a silica particle by a sol-gel method having a narrow particle size distribution, to a toner. According to this, the large-diameter silica particle produce a spacer effect, the toner is suppressed from being in direct contact with the developing roller, the regulating member, and the like, and the stress on the toner is reduced. As a result, damage to the toner is suppressed, and a long life of the toner is achieved.

Japanese Patent Application Laid-Open No. 2014-197064 proposes a modified rubber elastic body including a rubber elastic body having rubber elasticity and a surface-treated layer composed of a cured product of a photocurable composition impregnated from a surface of the rubber elastic body, and a developing roller using the modified rubber elastic body. It describes that, according to this, a surface of the developing roller is cured by the photocurable composition, and thus that the friction is reduced, leading to an increase in life of the developing roller.

Japanese Patent Application Laid-Open No. 2019-95784 proposes a method in which a surface layer of a latent image carrier is formed of a resin having excellent mechanical strength, and high surface hardness is imparted thereto to provide durability. In this prior example, even in a case of high hardness of the surface layer of the latent image carrier, strong adhesion of the toner to the surface layer of the latent image carrier is suppressed, and, at the same time, adhesion of the toner to the surface of a charging member can be suppressed. As a result, it is possible to provide a process cartridge and an electrophotographic apparatus in which fluctuation of a charging potential during long-term use is suppressed.

As a result of studies by the present inventors, it has been found that there is a problem in achieving both suppression of image smearing and suppression of scratches on a surface of a photosensitive member (hereinafter, also referred to as "drum scratches") in printing evaluations for many sheets in any case.

A factor in occurrence of image smearing or drum scratches due to printing repeated many times is considered as follows.

First, a factor in occurrence of image smearing will be described. When printing is repeated many times, ozone generated in a step of charging the photosensitive member reacts with nitrogen in the air to generate a nitrogen oxide ($NO_x$). This nitrogen oxide reacts with moisture in the air to form nitric acid, which adheres to a surface of the photosensitive member to reduce the resistance of the surface of the photosensitive member. As a result, a latent image on the photosensitive member is disturbed at the time of image formation, so that image smearing occurs.

The image smearing is a phenomenon that is particularly likely to occur when a photosensitive member having a hard surface is used. In addition, if a component that scrapes off the generated nitrogen oxide is contained, occurrence of image smearing can be suppressed.

Next, a factor in occurrence of drum scratches will be described. When a toner containing a high-hardness external additive such as large-diameter silica and a photosensitive member having a hard surface are used in combination, the silica particle is made of a harder material, and therefore the surface of the photosensitive member is scratched.

An object of the present invention is to provide a process cartridge that achieves both suppression of image smearing and suppression of drum scratches, while increasing the speed and the life.

As a result of intensive studies to solve the above problems, the present inventors have found that the above problems can be solved by a process cartridge including a toner, a developing roller, and an electrophotographic photosensitive member as will be described below.

SUMMARY OF THE INVENTION

The process cartridge according to the present invention is a process cartridge detachably attachable to an electrophotographic apparatus main body, the process cartridge including:

an electrophotographic photosensitive member;

a toner; and a developing roller, wherein a surface layer of the electrophotographic photosensitive member has a Martens hardness of 245 to 300 $N/mm^2$ as measured with an indentation force of 7 mN, the developing roller comprises:

an electroconductive substrate; and a single-layered surface layer containing a binder resin on the substrate, when an elastic modulus of the binder resin in a first region is E1, the first region being a region from an outer surface of the single-layered surface layer to a depth of 0.1 μm, and an elastic modulus of the binder resin in a second region is E2, the second region being a region from a depth of 1.0 μm to a depth of 1.1 μm from the outer surface as measured in a cross section in a thickness direction of the single-layered surface layer, the following formulas (1) and (2) are satisfied:

$$E1 \geq 200\ \text{MPa} \quad (1);$$

$$10\ \text{MPa} \leq E2 \leq 150\ \text{MPa} \quad (2),$$

the elastic modulus in the second region continuously decreases from that in the first region, the toner comprises a toner particle, and an external additive A, the external additive A is a silica particle having a major diameter of 40 to 400 nm, and a coverage of the external additive A with respect to a surface of the toner particle is 3.0% or more.

According to the present invention, it is possible to provide a process cartridge that achieves both suppression of image smearing and suppression of drum scratches while increasing the speed and the life.

Further features of the present invention will become apparent from the following description of exemplary embodiments with reference to the attached drawings.

DESCRIPTION OF THE EMBODIMENTS

Figure 1A:
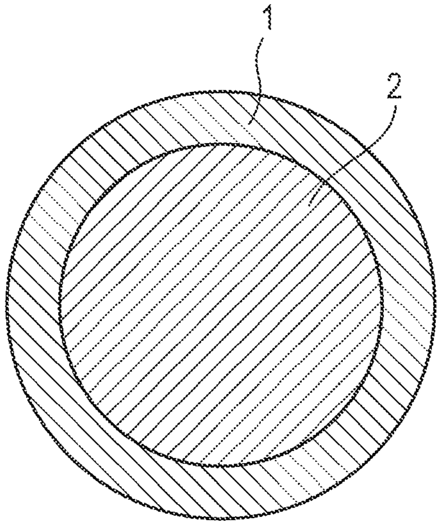
FIGS. 1A and 1B are schematic diagrams illustrating an electrophotographic member (developing roller) according to the present invention.

Hereinafter, the present invention will be described in detail.

The present invention relates to a process cartridge detachably attachable to an electrophotographic apparatus main body, the process cartridge including:

an electrophotographic photosensitive member;

a toner; and a developing roller, wherein a surface layer of the electrophotographic photosensitive member has a Martens hardness of 245 to 300 $N/mm^2$ as measured with an indentation force of 7 mN, the developing roller comprises:

an electroconductive substrate; and a single-layered surface layer containing a binder resin on the substrate, when an elastic modulus of the binder resin in a first region is E1, the first region being a region from an outer surface of the single-layered surface layer to a depth of 0.1 μm, and an elastic modulus of the binder resin in a second region is E2, the second region being a region from a depth of 1.0 μm to a depth of 1.1 μm from the outer surface as measured in a cross section in a thickness direction of the single-layered surface layer, the following formulas (1) and (2) are satisfied:

$$E1 \geq 200\ \text{MPa} \quad (1);$$

$$10\ \text{MPa} \leq E2 \leq 150\ \text{MPa} \quad (2),$$

the elastic modulus in the second region continuously decreases from that in the first region, the toner comprises a toner particle, and an external additive A, the external additive A is a silica particle having a major diameter of 40 to 400 nm, and a coverage of the external additive A with respect to a surface of the toner particle is 3.0% or more.

The reason why the effects of the present invention can be obtained by satisfying the above configuration is not clear, but a mechanism assumed by the present inventors will be described below.

First, examples of the cause of occurrence of image smearing include a nitrogen oxide (NOx) generated in a charging step. This nitrogen oxide reacts with moisture in the air to form nitric acid, which adheres to a surface of the photosensitive member to reduce the resistance of the surface of the photosensitive member. As a result, a latent image on the electrophotographic photosensitive member is disturbed at the time of image formation, so that image smearing occurs. Therefore, if the nitrogen oxide generated in the charging step can be removed, image smearing can be suppressed.

Although several methods for removing a nitrogen oxide have been proposed in the past, the present invention focuses on a technique for removing a nitrogen oxide by scratching the surface of the photosensitive member with fine particle added to the toner. This technique is useful as a method for suppressing image smearing while imparting functionality to the toner.

However, simply when a component for removing a nitrogen oxide to the toner (hereinafter, also referred to as a "removing agent") is added to the toner, the surface of the photosensitive member may be scratched although image smearing can be suppressed. The reason for this is considered to be that, when a member having a hard surface is used in association with an increase in life of the electrophotographic apparatus, a harder removing agent is circumferentially rubbed by hard members.

It is considered that the above problem can be solved by the configuration of the present invention.

First, due to the toner containing the silica particle, the silica particle remain on a surface of the developing roller after development. In addition to this state, the elastic modulus E1 in the first region of the developing roller is 200 MPa or more. Therefore, it is considered that the silica particle can be pressed against the surface of the photosensitive member with a pressure sufficient to remove the nitrogen oxide on the surface of the photosensitive member. As a result, it is considered that image smearing can be suppressed. When E1 is 200 MPa or less, the pressure for pressing the silica particle against the surface of the photosensitive member is insufficient. Therefore, the nitrogen oxide cannot be removed, and image smearing occurs. An upper limit of E1 is not particularly limited, but is set within an appropriate range in relation to the elastic modulus E2 in the second region and an elastic modulus E3 in a third region which will be described later. However, when E1 is too high, the pressure for pressing the silica particle against the surface of the photosensitive member becomes excessively large, so that the possibility of occurrence of drum scratches increases. Therefore, E1 is preferably 4500 MPa or less.

Furthermore, it is considered that, when the elastic modulus E2 of the developing roller is 10 to 150 MPa, the pressure for pressing the silica particle against the surface of the photosensitive member can be released into the developing roller, and thus that the silica particle are suppressed from biting into the surface of the photosensitive member. As a result, drum scratches are considered to be suppressed. When E2 is lower than 10 MPa, the pressure for pressing the silica particle against the surface of the photosensitive member is excessively released into the developing roller, so that the ability to remove a nitrogen oxide is deteriorated. In addition, when E2 is higher than 150 MPa, the pressure for pressing the silica particle against the surface of the photosensitive member becomes excessively large, and thus drum scratches occur. A range of E2 is more preferably 20 to 100 MPa.

In addition, since the toner contains silica particle having a major diameter of 40 to 400 nm (hereinafter, large-diameter silica particle) as the external additive A, the large-diameter silica particle can exist as a spacer between the surface of the photosensitive member and the surface of the developing roller. Therefore, it is considered that a nitrogen oxide can be efficiently removed because the pressure at which the surface of the developing roller presses the large-diameter silica particle against the surface of the photosensitive member can be sufficiently obtained. When the major diameter of the large-diameter silica particle is 40 nm or less, the large-diameter silica particle is buried between the photosensitive member and the developing roller, so that the large-diameter silica particle does not serve as a spacer any longer, and the effects as the removing agent are not exhibited. When the major diameter is 400 nm or more, the large-diameter silica particle is too large as a spacer, the pressure for pressing the large-diameter silica particle against the surface of the photosensitive member becomes excessively large, and drum scratches occur. A range of the major diameter of the large-diameter silica particle is more preferably 80 to 300 nm. In addition, a coverage of the large-diameter silica particle with respect to the surface of the toner particle is 3.0% or more. When the coverage is lower than 3.0%, the large-diameter silica particle serving as a nitrogen oxide removing agent are insufficient, and the nitrogen oxide generated on the surface of the photosensitive member cannot be scraped off, so that image smearing occurs. The coverage of the large-diameter silica particle is more preferably 5.0 to 30%. When the coverage is larger than 30%, an amount of the removing agent becomes too large, so the nitrogen oxide can be sufficiently removed, but when many sheets are printed, drum scratches may occur. The coverage of the large-diameter silica particle can be controlled by the major diameter and an amount of the large-diameter silica particle to be added.

In addition, a relationship among the elastic modulus E1 of the developing roller, a coverage H % of the large-diameter silica particle, and a fixation rate S % of the large-diameter silica particle according to the present invention, i.e., $E1\times(H/100)\times(1-S/100)$, is preferably 3.0 to 400.0. It is more preferably 5.0 to 200.0. The fixation rate of the large-diameter silica particle is preferably 30 to 80%, and more preferably 40 to 70%. This formula indicates that the effects of the present invention can be more effectively exhibited by controlling supply efficiency of the large-diameter silica particle to the surface of the developing roller with respect to the elastic modulus E1 in the first region of the developing roller. For example, when a developing roller having a high elastic modulus E1 is used, the pressure for pressing the large-diameter silica particle on the developing roller against the surface of the photosensitive member increases. At that time, if the supply amount of the large-diameter silica particle is too large, the removing ability becomes excessive, and drum scratches may occur. When $E1\times(H/100)\times(1-S/100)$ is less than 3.0, the supply of large-diameter silica particle is insufficient, so that it becomes difficult to remove a nitrogen oxide on the surface of the photosensitive member. When $E1\times(H/100)\times(1-S/100)$ is more than 400.0, the supply of large-diameter silica particle is excessive, and drum scratches may occur. The coverage and the fixation rate of the large-diameter silica particle with respect to the surface of the toner can be controlled by the amount of the large-diameter silica particle to be added and conditions for external addition thereof.

In addition, the toner of the present invention preferably contains silica particle having a major diameter of 5 nm to 40 nm or less (hereinafter, small-diameter silica particle) as an external additive B, and a coverage of a combination of the large-diameter silica particle and the small-diameter silica particle with respect to the toner particle is 62 to 100%. When the coverage is 62% or more, the fluidity of the toner is improved, and the probability that the large-diameter silica particle on the toner will come into contact with the surface of the developing roller is increased. Therefore, the supply efficiency of the large-diameter silica particle is increased, and the removal of a nitrogen oxide is further promoted. The coverage of the small-diameter silica particle with respect to the surface of the toner can be controlled by the amount of the small-diameter silica particle to be added and conditions for external addition thereof.

In addition, the toner of the present invention preferably has a fixation rate of a combination of the large-diameter silica particle and the small-diameter silica particle of 70% or more. When the fixation rate is 70% or more, the toner fluidity can be maintained until a latter half of duration. Thus, the effects of the present case can be easily obtained even when many sheets are printed. The fixation rate of a combination of the large-diameter silica particle and the small-diameter silica particle can be controlled by the amounts of the large-diameter silica particle and the small-diameter silica particle to be added and conditions for external addition thereof.

In the toner of the present invention, a dispersity index of the large-diameter silica particle with respect to the surface of the toner particle is preferably 0.5 to 2.0. The dispersity index is more preferably 0.5 to 1.2. A method of calculating the dispersity index will be described later. When the dispersity index is less than 0.5, the toner fluidity is reduced, and the probability that the large-diameter silica particle on the surface of the toner particle will come into contact with the surface of the developing roller is reduced. Therefore, the supply efficiency of the large-diameter silica particle is reduced, and a nitrogen oxide is removed with difficulty. When the dispersity is larger than 2.0, due to the presence of a portion where the surface of the toner particle is largely exposed, the probability that the large-diameter silica particle on the surface of the toner particle will come into contact with the surface of the developing roller is reduced. Therefore, the supply efficiency of the large-diameter silica particle is reduced, and a nitrogen oxide is removed with difficulty.

When an elastic modulus in a third region is E3, the third region being a region from a depth of 0.5 μm to a depth of 0.6 μm from the outer surface of the surface layer of the developing roller of the present invention, the E1 and the E3 preferably satisfy $(E1-E3)/E3>1$. This indicates that E3 is smaller than a half value of E1, and, when E3 falls within this range, the pressure at which the surface of the developing roller presses the large-diameter silica particle against the surface of the photosensitive member can be appropriately controlled, so that the effects of the present invention can be more effectively exhibited.

The developing roller of the present invention preferably contains a crosslinked urethane resin as a binder resin. Since the binder resin which is a crosslinked urethane resin can be designed in a wide range from a low elastic modulus to a high elastic modulus and has excellent durability, it is possible to maintain the pressure for pressing the large-diameter silica particle against the surface of the photosensitive member over a long period of time. In addition to the crosslinked urethane resin, the surface layer may contain a surfactant such as a modified silicone compound or a modified fluorine compound. The surfactant can have both a low-polarity group such as a silicone-containing group or a fluorine-containing group and a high-polarity group at a modified site thereof. Due to a large polarity difference between the urethane group or other high-polarity group of the crosslinked urethane resin and the low-polarity group such as a silicone-containing group or a fluorine-containing group in the surfactant molecule, the surfactant moves to the vicinity of an outer surface of the surface layer and remains. Furthermore, when an acrylic monomer and a polymerization initiator are swollen from the outer surface with respect to the crosslinked urethane resin containing the surfactant, an acrylic monomer having a small polarity difference from the high-polarity group in the surfactant molecule is used, so that the acrylic monomer remains near the surfactant. That is, since the acrylic monomer remains near the outer surface and is cured, a developing roller having an elastic modulus distribution as in the present invention can be prepared.

Hereinafter, embodiments of the present invention will be described in detail.

First, a method for producing a toner base of the present invention will be described. As the method for producing a toner base, a known method can be used, and a kneading and pulverizing method or a wet production method can be used. A wet production method can be preferably used from the viewpoint of uniformity of particle diameter and shape controllability. Furthermore, examples of the wet production method include a suspension polymerization method, a dissolution suspension method, an emulsion polymerization aggregation method, and an emulsion aggregation method, and, in the present invention, an emulsion aggregation method can be preferably used.

In the emulsion aggregation method, first, materials such as fine particle of a binder resin and a colorant are dispersed and mixed in an aqueous medium containing a dispersion stabilizer. A surfactant may be added to the aqueous medium. Thereafter, an aggregating agent is added to perform aggregation until a desired toner particle diameter is obtained, and, then or simultaneously with aggregation, resin fine particle are fused to each other. Further, if necessary, shape control by heat is performed to form toner particle. Here, the fine particle of the binder resin may be composite particle formed of a plurality of layers composed of two or more layers of resins having different compositions. For example, the toner base can be produced by an emulsion polymerization method, a mini-emulsion polymerization method, a phase inversion emulsification method, or the like, or can be produced by combining several production methods.

When an internal additive is contained in the toner base, the internal additive may be contained in the resin fine particle, or a dispersion of the internal additive fine particle consisting only of the internal additive is prepared separately, and the internal additive fine particle may be aggregated together when the resin fine particle is aggregated. In addition, it is also possible to form toner particle having a configuration of layers having different compositions by adding resin fine particle having different composition at the time of aggregation with a time difference and aggregating the resin fine particle.

As the dispersion stabilizer, the following can be used. Examples of inorganic dispersion stabilizers include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina.

Examples of organic dispersion stabilizers include polyvinyl alcohol, gelatin, methyl cellulose, methyl hydroxypropyl cellulose, ethyl cellulose, sodium salts of carboxymethyl cellulose, and starch.

As the surfactant, a known cationic surfactant, anionic surfactant or nonionic surfactant can be used. Specific examples of the cationic surfactant include dodecylammonium bromide, dodecyltrimethylammonium bromide, dodecylpyridinium chloride, dodecylpyridinium bromide, and hexadecyltrimethylammonium bromide. Specific examples of the nonionic surfactant include dodecyl polyoxyethylene ether, hexadecyl polyoxyethylene ether, nonylphenyl polythioethylene ether, lauryl polyoxyethylene ether, sorbitan monooleate polyoxyethylene ether, styryl phenyl polyoxyethylene ether, and monodecanoyl sucrose. Specific examples of the anionic surfactant include aliphatic soaps such as sodium stearate and sodium laurate, sodium lauryl sulfate, sodium dodecylbenzene sulfonate, and sodium polyoxyethylene (2) lauryl ether sulfate.

The binder resin constituting the toner base will be described.

Preferable examples of the binder resin can include a vinyl-based resin and a polyester resin. Examples of the vinyl-based resin, the polyester resin, and other binder resins include the following resins or polymers.

Homopolymers of styrene and a substituted product thereof, such as polystyrene and polyvinyltoluene; styrene-based copolymers such as a styrene-propylene copolymer, a styrene-vinyl toluene copolymer, a styrene-vinyl naphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer, and a styrene-maleic acid ester copolymer; polymethyl methacrylate, polybutyl methacrylate, polyvinyl acetate, polyethylene, polypropylene, polyvinyl butyral, silicone resin, polyamide resin, epoxy resin, polyacrylic resin, rosin, modified rosin, terpene resin, phenol resin, aliphatic or alicyclic hydrocarbon resin, aromatic petroleum resin. These binder resins can be used alone or in combination.

The binder resin preferably contains a carboxy group, and is preferably a resin produced using a polymerizable monomer containing a carboxy group. For example, vinyl carboxylic acids such as acrylic acid, methacrylic acid, α-ethylacrylic acid, and crotonic acid; unsaturated dicarboxylic acids such as fumaric acid, maleic acid, citraconic acid, and itaconic acid; and unsaturated dicarboxylic acid monoester derivatives such as succinic acid monacryloyloxyethyl ester, succinic acid monacryloyloxyethyl ester, phthalic acid monacryloyloxyethyl ester, and phthalic acid monomethacryloyloxyethyl ester.

As the polyester resin, a polyester resin obtained by condensation polymerization of a carboxylic acid component and an alcohol component as will be listed below can be used. Examples of the carboxylic acid component include terephthalic acid, isophthalic acid, phthalic acid, fumaric acid, maleic acid, cyclohexanedicarboxylic acid, and trimellitic acid. Examples of the alcohol component include bisphenol A, hydrogenated bisphenol, an ethylene oxide adduct of bisphenol A, a propylene oxide adduct of bisphenol A, glycerin, trimethylolpropane, and pentaerythritol.

The polyester resin may be a polyester resin containing a urea group. In the polyester resin, a carboxy group at a terminal or the like is preferably not capped.

In order to control a molecular weight of the binder resin constituting the toner base, a crosslinking agent may be added during polymerization of the polymerizable monomer.

For example, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinylbenzene, bis(4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylate, polyester type diacrylate (MANDA, Nippon Kayaku Co., Ltd.), and methacrylate versions of the acrylates described above.

An amount of the crosslinking agent to be added is preferably 0.001 to 15.000 mass % with respect to the polymerizable monomer.

In the present invention, it is preferable to incorporate a mold release agent as one of the materials constituting the toner base. In particular, when an ester wax having a melting point of 60 to 90° C. is used, a plasticizing effect is easily obtained because of excellent compatibility with the binder resin.

Examples of the ester wax used in the present invention include waxes containing a fatty acid ester as a main component, such as carnauba wax and montanic acid ester wax; waxes obtained by partially or entirely deoxidizing acid components from fatty acid esters, such as deoxidized carnauba wax; methyl ester compounds having a hydroxyl group, obtained by hydrogenation or the like of vegetable fat and oil; saturated fatty acid monoesters such as stearyl stearate and behenyl behenate; diesterified products of saturated aliphatic dicarboxylic acids and saturated aliphatic alcohols, such as dibehenyl sebacate, distearyl dodecanedioate, and distearyl octadecanedioate; diesterified products of saturated aliphatic diols and saturated aliphatic monocarboxylic acids, such as nonanediol dibehenate and dodecanediol distearate.

Among these waxes, it is preferable to incorporate a bifunctional ester wax (diester) having two ester bonds in the molecular structure.

The bifunctional ester wax is an ester compound of a dihydric alcohol and an aliphatic monocarboxylic acid, or an ester compound of a dihydric carboxylic acid and an aliphatic monoalcohol.

Specific examples of the aliphatic monocarboxylic acid include myristic acid, palmitic acid, stearic acid, arachidic acid, behenic acid, lignoceric acid, cerotic acid, montanic acid, melisic acid, oleic acid, vaccenic acid, linoleic acid, and linolenic acid.

Specific examples of the aliphatic monoalcohol include myristyl alcohol, cetanol, stearyl alcohol, arachidyl alcohol, behenyl alcohol, tetracosanol, hexacosanol, octacosanol, and triacontanol.

Specific examples of the divalent carboxylic acid include butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), dodecanedioic acid, tridecanedioic acid, tetradecanedioic acid, hexadecanedioic acid, octadecanedioic acid, eicosanedioic acid, phthalic acid, isophthalic acid, and terephthalic acid.

Specific examples of the dihydric alcohol include ethylene glycol, propylene glycol, 1,3-propanediol, 1,4-butanediol, 1,5-pentanediol, 1,6-hexanediol, 1,10-decanediol, 1,12-dodecanediol, 1,14-tetradecanediol, 1,16-hexadecanediol, 1,18-octadecanediol, 1,20-eicosanediol, 1,30-triacontanediol, diethylene glycol, dipropylene glycol, 2,2,4-trimethyl-1,3-pentanediol, neopentyl glycol, 1,4-cyclohexanedimethanol, spiroglycol, 1,4-phenylene glycol, bisphenol A, and hydrogenated bisphenol A.

Other mold release agents that may be used include paraffin waxes, microcrystalline waxes, petroleum-based waxes such as petrolatum and derivatives thereof, montan waxes and derivatives thereof, hydrocarbon waxes by a Fischer-Tropsch process and derivatives thereof, polyolefin waxes such as polyethylene and polypropylene and derivatives thereof, natural waxes such as carnauba wax and candelilla wax and derivatives thereof, and higher aliphatic alcohols, fatty acids such as stearic acid and palmitic acid, or compounds thereof. A content of the mold release agent is preferably 5.0 to 20.0 parts by mass with respect to 100.0 parts by mass of the binder resin or the polymerizable monomer.

In the present invention, when a colorant is contained in the toner particle, the colorant is not particularly limited, and known ones which will be described below can be used.

As a yellow pigment, a condensed azo compound such as yellow iron oxide, naples yellow, Naphthol Yellow S, Hansa Yellow G, Hansa Yellow 10G, Benzidine Yellow G, Benzidine Yellow GR, quinoline yellow lake, Permanent Yellow NCG, or tartrazine lake, an isoindolinone compound, an anthraquinone compound, an azo metal complex, a methine compound, or an allylamide compound is used. Specific examples of the yellow pigment include the following pigments.

C.I. Pigment Yellow 12, 13, 14, 15, 17, 62, 74, 83, 93, 94, 95, 109, 110, 111, 128, 129, 147, 155, 168, 180.

Examples of red pigments include condensed azo compounds such as red iron oxide, Permanent Red 4R, lithol red, pyrazolone red, watching red calcium salt, Lake Red C, Lake Red D, Brilliant Carmine 6B, Brilliant Carmine 3B, eosin lake, Rhodamine Lake B, and alizarin lake, diketopyrrolopyrrole compounds, anthraquinone, quinacridone compounds, base dye lake compounds, naphthol compounds, benzimidazolone compounds, thioindigo compounds, and perylene compounds. Specific examples of the red pigment include the following pigments.

C.I. Pigment Red 2, 3, 5, 6, 7, 23, 48:2, 48:3, 48:4, 57 1, 81:1, 122, 144, 146, 166, 169, 177, 184, 185, 202, 206, 220, 221, 254.

Examples of blue pigments include copper phthalocyanine compounds and derivatives thereof, such as alkali blue lake, victoria blue lake, phthalocyanine blue, metal-free phthalocyanine blue, phthalocyanine blue partial chloride, first sky blue, and Indanthrene Blue BG, anthraquinone compounds, and base dye lake compounds. Specific examples of the blue pigment include the following pigments.

C.I. Pigment Blue 1, 7, 15, 15:1, 15:2, 15:3, 15:4, 60, 62, 66.

Examples of black pigments include carbon black and aniline black. These colorants can be used alone or in combination, and further in a solid solution state.

A content of the colorant is preferably 3.0 to 15.0 parts by mass with respect to 100.0 parts by mass of the binder resin or the polymerizable monomer.

In the present invention, the toner base may contain a charge control agent. As the charge control agent, a known charge control agent can be used. In particular, a charge control agent having a high charging speed and capable of stably maintaining a constant charge amount is preferable.

Examples of charge control agents that control the toner particle to have negative chargeability include the following.

As organometallic compounds and chelate compounds, a monoazo metal compound, an acetylacetone metal compound, an aromatic oxycarboxylic acid, an aromatic dicarboxylic acid, oxycarboxylic acid- and dicarboxylic acid-based metal compounds. Other examples include aromatic oxycarboxylic acids, aromatic mono- and poly-carboxylic acids and metal, anhydrides, or esters thereof, and phenol derivatives such as bisphenols. Furthermore, examples include urea derivatives, metal-containing salicylic acid-based compounds, metal-containing naphthoic acid-based compounds, boron compounds, quaternary ammonium salts, and calixarenes.

On the other hand, examples of charge control agents that control the toner particle to have positive chargeability include the following. Nigrosine and nigrosine-modified products modified with a fatty acid metal salt; guanidine compounds; imidazole compounds; quaternary ammonium salts such as tributylbenzylammonium 1-hydroxy-4-naphthosulfonate and tetrabutylammonium teterafluoroborate, and analogues of these, including onium salts such as phosphonium salts, and lake pigments of these;

triphenylmethane dyes and lake pigments of these (lake-forming agents may include tungstophosphoric acid, molybdophosphoric acid, tungstomolybdophosphoric acid, tannic acid, lauric acid, gallic acid, ferricyanides and ferrocyanides); metal salts of higher fatty acids; and resin-based charge control agents.

These charge control agents can be contained singly, or two or more thereof can be contained in combination. An amount of these charge control agents to be added is preferably 0.01 to 10.00 parts by mass with respect to 100.00 parts by mass of the polymerizable monomer.

Next, the external additive A used in the present invention will be described.

As a method for producing the external additive A used in the present invention, any method may be used, but a sol-gel method is preferable. A method for producing silica particle through a sol-gel method will be described below.

First, alkoxysilane is catalytically hydrolyzed and condensed in an organic solvent in which water exists, to obtain a silica sol suspension. Then, the solvent is removed from the silica sol suspension, and the silica sol suspension is dried to obtain silica fine particle.

The major diameter of the silica particle obtained by the sol-gel method can be controlled by a reaction temperature in the hydrolysis/condensation reaction step, a dropping rate of the alkoxysilane, a weight ratio among water, the organic solvent, and the catalyst, and a stirring rate.

The silica particle thus obtained are usually hydrophilic and include many surface silanol groups. Therefore, when the silica particle is used as an external additive of the toner, it is preferable to hydrophobize the surfaces of the silica particle.

Examples of a hydrophobizing treatment method include a method in which a solvent is removed from the silica sol suspension, and the silica sol suspension is dried, and then the dried product is treated with a hydrophobizing agent, and a method in which a hydrophobizing agent is directly added to the silica sol suspension, and the silica sol suspension is treated simultaneously with drying. From the viewpoint of controlling a half-width of particle size distribution and controlling a saturated moisture adsorption amount, a technique of directly adding a hydrophobizing agent to the silica sol suspension is preferable.

Examples of the hydrophobizing method include a method of chemical treatment with an organosilicon compound that reacts with or physically adsorbs silica. As a preferred method, silica generated by vapor phase oxidation of a silicon halogen compound is treated with an organosilicon compound.

Examples of such an organosilicon compound include the following compounds.

Hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane.

Furthermore, examples include brommethyldimethylchlorosilane, α-chloroethyltrichlorosilane, β-chloroethyltrichlorosilane, chlormethyldimethylchlorosilane, triorganosilyl mercaptan, trimethylsilyl mercaptan, and triorganosilyl acrylate.

Furthermore, examples include vinyldimethylacetoxysilane, dimethylethoxysilane, dimethyldimethoxysilane, diphenyldiethoxysilane, and 1-hexamethyldisiloxane.

Furthermore, examples include 1,3-divinyltetramethyldisiloxane, 1,3-diphenyltetramethyldisiloxane, and dimethylpolysiloxane having 2 to 12 siloxane units per molecule and having one hydroxyl group for each Si as a unit located at a terminal.

These compounds are used singly, or a mixture of two or more thereof is used.

In silicone oil-treated silica, a silicone oil having a viscosity at 25° C. of 30 to 1000 $mm^2/s$ is preferably used.

Examples of the silicone oil include dimethyl silicone oil, methylphenyl silicone oil, α-methylstyrene-modified silicone oil, chlorphenyl silicone oil, and fluorine-modified silicone oil.

Examples of a silicone oil treatment method include the following methods.

A method of directly mixing silica treated with a silane coupling agent and a silicone oil using a mixer such as an FM mixer.

A method of spraying a silicone oil onto silica as abase. Alternatively, a method in which a silicone oil is dissolved or dispersed in an appropriate solvent, silica is then added and mixed, and the solvent is removed.

In the silicone oil-treated silica, it is more preferable to heat the silica to a temperature of 200° C. or higher (more preferably 250° C. or higher) in an inert gas after the treatment with the silicone oil to stabilize the coating on the surface of the silica.

Furthermore, the silica particle may be subjected to a crushing treatment in order to facilitate monodispersion of the silica fine particle on the surface of the toner particle or to allow the silica fine particle to exhibit a stable spacer effect.

A major diameter of the external additive B used in the present invention is 5 to 40 nm. Examples of a method for producing the external additive B include a sedimentation method and a sol-gel method for wet silica, and a deflagration method and a fumed method for dry silica. It is preferable that the external additive B is dry silica.

The dry silica is preferably made of a silicon halogen compound or the like as a raw material.

Silicon tetrachloride is used as the silicon halogen compound, but silanes such as methyltrichlorosilane and trichlorosilane alone, or a mixture of silicon tetrachloride and a silane can also be used as a raw material.

It is preferable to obtain the target silica by a so-called flame hydrolysis reaction in which the raw material is reacted with water generated as an intermediate in an oxyhydrogen flame, after vaporization of the raw material.

For example, a thermal decomposition oxidation reaction in oxygen and hydrogen of silicon tetrachloride gas is used, and the reaction formula is as follows.

$$SiCl_4+2H_2+O_2 \rightarrow SiO_2+4HCl$$

Hereinafter, a method for producing dry silica will be described.

Oxygen gas is supplied to a burner, and an ignition burner is ignited. Thereafter, hydrogen gas is supplied to the burner to form a flame, and silicon tetrachloride as a raw material is charged into the flame for gasification. Next, at least a flame hydrolysis reaction is performed to recover the silica powder generated.

An average particle diameter of the silica powder can be adjusted by appropriately changing a silicon tetrachloride flow rate, an oxygen gas supply flow rate, a hydrogen gas supply flow rate, and a retention time of the silica in the flame.

In addition, the external additive B is also preferably subjected to the same surface treatment as the surface treatment of the external additive A.

Next, the developing roller of the present invention will be described.

Figure 1B:
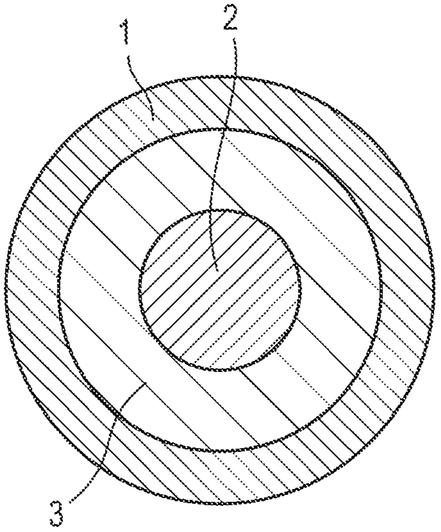

FIG. 1A is a circumferential cross-sectional view of a roller-shaped electrophotographic member (developing roller) having an electroconductive shaft core body 2 as an electroconductive substrate and a surface layer 1 on a peripheral surface of the substrate. FIG. 1B is a circumferential cross-sectional view of a roller-shaped electrophotographic member (developing roller) having a shaft core body 2 as an electroconductive substrate and an intermediate layer 3 between a surface layer 1 and the shaft core body 2. The intermediate layer 3 is not limited to a monolayer, and may be composed of a plurality of layers. For example, in a nonmagnetic one-component contact development process, a developing member in which the surface layer 1 is provided on the electroconductive substrate in which the intermediate layer 3 is laminated on the shaft core body 2 is suitably used.

[Electroconductive Substrate]

As the electroconductive substrate, a columnar or hollow cylindrical electroconductive shaft core body, or one in which one or more electroconductive intermediate layers are further provided on such a shaft core body can be used. The shaft core body has a columnar shape or a hollow cylindrical shape, and is made of the following electroconductive material. A metal or alloy such as aluminum, a copper alloy, or stainless steel; iron plated with chromium or nickel; an electroconductive synthetic resin. A known adhesive can also be applied to the surface of the shaft core body 2 for the purpose of improving adhesion with the intermediate layer 3, the surface layer 1, and the like on an outer periphery thereof.

As described above, in the nonmagnetic one-component contact developing process, a developing member in which the intermediate layer 3 is laminated between the shaft core body 2 and the surface layer 1 is suitably used. The intermediate layer imparts hardness and elasticity to the developing member such that the developing member is pressed against an image carrier with an appropriate nip width and nip pressure so that the toner can be supplied to an electrostatic latent image formed on the surface of the image carrier without excess or deficiency.

The intermediate layer is usually preferably formed of a molded body of a rubber material. Examples of the rubber material include the following materials. Ethylene-propylene-diene copolymer rubber (EPDM), acrylonitrile-butadiene rubber (NBR), chloroprene rubber (CR), natural rubber (NR), isoprene rubber (IR), styrene-butadiene rubber (SBR), fluororubber, silicone rubber, epichlorohydrin rubber, hydride of NBR, and urethane rubber. These materials can be used alone, or two or more thereof can be used in combination. Among them, silicone rubber that hardly causes compression set even when another member (such as a toner regulating member) abuts over a long period of time is particularly preferable. Specific examples of the silicone rubber include a cured product of addition-curable silicone rubber.

The intermediate layer can be an intermediate layer obtained by blending an electroconductivity imparting agent such as an electronic electroconductive substance or an ionic electroconductive substance in the rubber material. A volume resistivity of the intermediate layer is adjusted to preferably $10^3$ to $10^{11}$ Ωcm, and more preferably $10^4$ to $10^{10}$ Ωcm.

Examples of the electronic electroconductive substance include the following substances. Carbon black such as electroconductive carbon, carbon for rubber, and carbon for color (ink); for example, electroconductive carbon black such as Ketjenblack EC and acetylene black; carbon for rubber, such as SAF, ISAF, HAF, FEF, GPF, SRF, FT, and MT; carbon for color (ink) subjected to oxidation treatment; metals such as copper, silver, and germanium and metal oxides thereof. Among them, electroconductive carbon [electroconductive carbon, carbon for rubber, carbon for color (ink)] is preferable because electroconductivity is easily controlled with a small amount.

Examples of the ionic electroconductive substance include the following substances. Inorganic ionic electroconductive substances such as sodium perchlorate, lithium perchlorate, calcium perchlorate, and lithium chloride;

organic ionic electroconductive substances such as modified aliphatic dimethyl ammonium ethosulfate and stearyl ammonium acetate.

These electroconductivity imparting agents are used in an amount necessary for adjusting the intermediate layer so that it has an appropriate volume resistivity as described above, and are usually used in an amount within the range of 0.5 to 50 parts by mass with respect to 100 parts by mass of the binder resin.

The intermediate layer may further contain various additives such as a plasticizer, a filler, an extender, a vulcanizing agent, a vulcanizing aid, a crosslinking aid, a curing inhibitor, an antioxidant, an antiaging agent, and a processing aid, as necessary. Examples of the filler include silica, quartz powder, and calcium carbonate. These optional components are blended in an amount that does not inhibit the function of the intermediate layer.

The intermediate layer has elasticity required of the developing member, and has an Asker C hardness of preferably 20 to 100 degrees, and a thickness of preferably 0.3 to 6.0 mm.

The materials for the intermediate layer can be mixed using a dynamic mixing device such as a uniaxial continuous kneader, a biaxial continuous kneader, a double roll, a kneader mixer, or a trimix, or a static mixing device such as a static mixer.

A method for forming the intermediate layer on the shaft core body is not particularly limited, and examples thereof include a die molding method, an extrusion molding method, an injection molding method, and a coating molding method. As the die molding method, for example, a method can be indicated in which first, pieces for holding the shaft core body in a mold are fixed to both ends of a cylindrical mold, and an injection port is formed in the pieces. Next, the shaft core body is disposed in the mold, a material for the intermediate layer is injected from the injection port, then the mold is heated at a temperature at which the material is cured, and the resultant product is demolded. Examples of the extrusion molding method include a method in which the shaft core body and a material for the intermediate layer are extruded together using a crosshead type extruder, and the material is cured to form the intermediate layer around the shaft core body.

The surface of the intermediate layer can also be modified by a surface modification method such as surface polishing, corona treatment, flame treatment, or excimer treatment in order to improve adhesion with the surface layer.

[Surface Layer]

The surface layer is a monolayer provided on the outermost surface of the electrophotographic member (developing roller), and is provided on the outermost peripheral surface in a case of a roller-shaped member. The surface layer can be directly formed on the shaft core body, but the surface layer can also be formed on the outer peripheral surface of a substrate in which the intermediate layer is provided on the shaft core body. The surface layer contains a binder resin. The binder resin preferably contains a crosslinked urethane resin.

[Method for Forming Surface Layer]

The surface layer of the present embodiment can be formed by the following steps.

Step of forming a resin layer containing a crosslinked urethane resin as a binder resin on an electroconductive substrate;

step of impregnating an outer surface of the resin layer with a liquid acrylic monomer; and step of curing the impregnated acrylic monomer.

The formation of the resin layer containing the crosslinked urethane resin is not particularly limited, but is preferably a coating molding method of a liquid coating material. For example, the resin layer can be formed by dispersing and mixing each material for the resin layer in a solvent to form a coating material, applying the coating material onto an electroconductive substrate, and drying and solidifying or heating and curing the coating material. As the solvent, a polar solvent is preferable from the viewpoint of compatibility with a polyol or an isocyanate compound which is a raw material of the crosslinked urethane resin. Examples of the polar solvent include alcohols such as methanol, ethanol, and n-propanol, ketones such as acetone, methyl ethyl ketone, and methyl isobutyl ketone, and esters such as methyl acetate and ethyl acetate. Among these solvents, one solvent or a mixture of two or more solvents having good compatibility with any other materials can be used. In addition, a solid content at the time of forming the coating material can be freely adjusted by an amount of the solvent to be mixed, but is preferably 20 to 40 mass % from the viewpoint of uniformly dispersing an electronic electroconductive substance such as carbon black which will be described later. For dispersion and mixing, a known dispersing apparatus using beads such as a sand mill, a paint shaker, Dyno Mill, or a pearl mill can be used. As a coating method, dip coating, ring coating, spray coating, or roll coating can be used.

In the resin layer, an electroconductivity imparting agent such as an electronic electroconductive substance or an ionic electroconductive substance can be blended in the crosslinked urethane resin. A volume resistivity of the surface layer is adjusted to preferably $10^3$ to $10^{11}$ Ωcm, and more preferably $10^4$ to $10^{10}$ Ωcm.

As the electronic electroconductive substance, an electroconductive filler which will be described later can be used, but electroconductive carbon is preferable because conductivity is easily controlled with a small amount.

Examples of the ionic electroconductive substance include the following substances. Inorganic ionic electroconductive substances such as sodium perchlorate, lithium perchlorate, calcium perchlorate, and lithium chloride; organic ionic electroconductive substances such as modified aliphatic dimethyl ammonium ethosulfate and stearyl ammonium acetate.

These electroconductivity imparting agents are used in an amount necessary for adjusting the surface layer so that it has an appropriate volume resistivity as described above, and are usually used in an amount within the range of 0.5 to 50 parts by mass with respect to 100 parts by mass of the binder resin.

Next, the resin layer formed as described above is impregnated with a liquid acrylic monomer. The liquid acrylic monomer can be impregnated as an impregnation treatment liquid as it is or appropriately diluted with any of various solvents. By appropriately diluting the liquid acrylic monomer with any of various solvents, a surface layer having a more uniform surface composition is obtained. The solvent can be freely selected as long as it satisfies both the affinity with the resin layer and the solubility of the acrylic monomer. Examples of the solvent include alcohols such as methanol, ethanol, and n-propanol, ketones such as acetone, methyl ethyl ketone, and methyl isobutyl ketone, and esters such as methyl acetate and ethyl acetate. In addition, a polymerization initiator can be appropriately blended in the impregnation treatment liquid. Details of the polymerization initiator will be described later. A method of impregnation with the impregnation treatment liquid is not particularly limited, but dip coating, ring coating, spray coating, or roll coating can be used.

The surface layer can be formed by performing the impregnation treatment with the impregnation treatment liquid in this manner and then polymerizing and curing the acrylic monomer. The polymerization and curing method is not particularly limited, and a known method can be used. Specific examples of the method include methods such as thermal curing and ultraviolet irradiation.

Through such a step, the crosslinked acrylic resin is introduced into a network structure of the crosslinked urethane resin of the resin layer in such a manner that the resins are entangled with each other. In this case, the acrylic monomer enters between the respective three-dimensional network structures of the crosslinked urethane resin and is polymerized to form a network structure of the crosslinked acrylic resin. A film thickness of the surface layer thus obtained is 1.1 μm or more in order to satisfy the requirements of the above formulae (1) and (2), and is preferably 1.4 μm or more, more preferably 2.0 μm or more from the viewpoint of film strength. An upper limit of the film thickness of the surface layer is not particularly set, but is 200.0 μm or less, preferably 160.0 μm or less, and more preferably 150.0 μm or less from the viewpoint of flexibility when a single-layered surface is formed on the substrate on which the intermediate layer is formed.

[Crosslinked Urethane Resin]

The surface layer contains a crosslinked urethane resin as the binder resin. The crosslinked urethane resin is suitable as the binder resin because it is excellent in flexibility and strength. The urethane resin can be obtained from a polyol and an isocyanate, and, if necessary, a chain extender. Examples of the polyol as a raw material of the urethane resin include polyether polyol, polyester polyol, polycarbonate polyol, polyolefin polyol, acrylic polyol, and mixtures thereof. Examples of the isocyanate as a raw material of the urethane resin include the following isocyanates. Tolylene diisocyanate (TDI), diphenylmethane diisocyanate (MDI), naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethylxylylene diisocyanate (TMXDI), cyclohexane diisocyanate, and mixtures thereof. Examples of the chain extender as a raw material of the urethane resin include difunctional low molecular weight diols such as ethylene glycol, 1,4-butanediol, and 3-methylpentanediol, trifunctional low molecular weight triols such as trimethylolpropane, and mixtures thereof. In addition, a prepolymer-type isocyanate compound having an isocyanate group at a terminal thereof, obtained by reacting any of various isocyanate compounds as described above with any of various polyols in advance in a state where the isocyanate group is excessive, may be used. As these isocyanate compounds, materials obtained by blocking the isocyanate group with any of various blocking agents such as MEK oxime may be used.

Even when any material is used, a urethane resin can be obtained by reacting a polyol with an isocyanate by heating. Furthermore, when either one or both of the polyol and the isocyanate has/have a branched structure and the number of functional groups is 3 or more, the resultant urethane resin becomes a crosslinked urethane resin.

[Crosslinked Acrylic Resin]

The crosslinked acrylic resin has high strength, but may be hard and brittle when used alone. Therefore, when the crosslinked acrylic resin is used as a single film for the surface layer of the electrophotographic member (developing roller), scratches are likely to occur due to scraping due to rubbing because of its brittleness. In addition, since it is hard, the load on the toner tends to increase, which may cause filming. On the other hand, in the network structure formed by impregnating a crosslinked urethane resin as the binder resin with an acrylic resin, hardness and brittleness are hardly exhibited in the vicinity of an extremely outer surface of the surface layer, and high strength can be imparted while keeping flexibility.

The crosslinked acrylic resin is formed by polymerization of an acrylic monomer. The acrylic monomer referred to herein means not only an acrylic monomer but also a methacrylic monomer. That is, the crosslinked acrylic resin is formed by polymerization of either or both of an acrylic monomer and a methacrylic monomer. A type of the acrylic monomer used here includes a polyfunctional monomer having a plurality of acryloyl groups or methacryloyl groups as functional groups in order to form a crosslinked structure. On the other hand, when there are four or more functional groups, a viscosity of the acrylic monomer is significantly increased, so that it is difficult for the acrylic monomer to be impregnated into the surface of the resin layer formed of the crosslinked urethane resin. Therefore, the acrylic monomer is preferably a monomer in which a total number of acryloyl groups and methacryloyl groups present in one molecule is two or three, and more preferably a bifunctional acrylic monomer in which the total number of acryloyl groups and methacryloyl groups is two. In addition, monofunctional monomers may be combined as necessary.

A molecular weight of the acrylic monomer is preferably in the range of 200 to 750.

As described above, the resin layer containing the crosslinked urethane resin is impregnated with the acrylic monomer. For that purpose, it has an appropriate viscosity. That is, it is difficult to perform impregnation at a high viscosity, and it is difficult to control the impregnation state at a low viscosity. Therefore, a viscosity of the acrylic monomer is preferably 5.0 to 140 mPa·s at 25° C.

A method of polymerizing the acrylic monomer is not particularly limited, and a known method can be used. Specific examples of the method include heating and ultraviolet irradiation.

For each polymerization method, a known radical polymerization initiator or ion polymerization initiator can be used.

Examples of the polymerization initiator in a case of polymerization by heating include peroxides such as 3-hydroxy-1,1-dimethylbutyl peroxy neodecanoate, α-cumyl peroxy neodecanoate, t-butyl peroxy neoheptanoate, t-butyl peroxy bivalate, t-amyl peroxy normal octoate, t-butyl peroxy 2-ethylhexyl carbonate, dicumyl peroxide, di-t-butyl peroxide, di-t-amyl peroxide, 1,1-di (t-butylperoxy) cyclohexane, and n-butyl-4, 4-di (t-butylperoxy) valerate; and azo compounds such as 2,2-azobisbutyronitrile, 2,2-azobis(4-methoxy-2, 4-dimethylvaleronitrile), 2,2-azobis(2,4-dimethylvaleronitrile), 2,2-azobis(2-methylbutyronitrile), 1,1-azobis(cyclohexane-1 carbonitrile), 2,2-azobis[2-(2-imidazolin-2 yl) propane], 2,2-azobis[2-methyl-N-(2-hydroxyethyl) propionamide], 2,2-azobis[N-(2-propenyl)-2 methylpropionamide], 2,2-azobis(N-butyl-2 methoxypropionamide), and dimethyl-2, 2-azobis(isobutyrate).

Examples of the polymerization initiator in a case of polymerization by ultraviolet irradiation include 2,2-dimethoxy-1, 2-diphenylethane-1-one, 1-hydroxycyclohexyl phenyl ketone, 2-hydroxy-2 methyl-1-phenylpropane-1-one, 1-[4-(2-hydroxyethoxy)-phenyl]-2 hydroxy-2 methyl-1 propane-1-one, 2-hydroxy-1-{4-[4-(2-hydroxy-2-methyl-propionyl)-benzyl]-phenyl}-2-methylpropane-1-one, 2-methyl-1-[4-(methylthio) phenyl]-2-morpholinopropane-1-one, 2-benzyl-2-dimethylamino-1-(4-morpholinophenyl)-butane-1-one, 2-dimethylamino-2-(4-methylbenzyl)-1-(4-morpholine-4-yl-phenyl)-butane-1-one, bis(2,4,6-trimethylbenzoyl)-phenylphosphine oxide, and 2,4,6-trimethylbenzoyl-diphenylphosphine oxide.

These polymerization initiators may be used singly, or two or more thereof can be used in combination.

In addition, an amount of the polymerization initiator to be blended is preferably 0.5 to 10 parts by mass, from the viewpoint of efficiently advancing the reaction, when a total amount of compounds for forming a specific resin (for example, a compound having a (meth) acryloyl group) is 100 parts by mass.

As a heating device and an ultraviolet irradiation device, known devices can be appropriately used. As a light source that emits ultraviolet rays, for example, an LED lamp, a high-pressure mercury lamp, a metal halide lamp, a xenon lamp, a low-pressure mercury lamp, or the like can be used. An integrated light amount required at the time of polymerization can be appropriately adjusted according to types and addition amounts of the compounds and polymerization initiator to be used.

Next, the photosensitive member of the present invention will be described.

In the surface layer of the electrophotographic photosensitive member according to the present invention, the surface layer containing a charge transporting substance preferably contains a polyester resin or a polycarbonate resin, and the polyester resin preferably has structures represented by the general formulas (I) and (II).

(I)

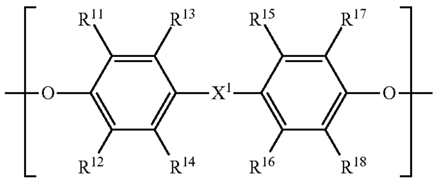

In the general formula (I), X1 represents a single bond, an oxygen atom, an alkylidene group, or a cycloalkylidene group. R 11 to R 18 each independently represent a hydrogen atom or an alkyl group.

Examples of the alkylidene group represented by X1 include a methylidene group, an ethylidene group, a propylidene group, a butylidene group, a pentylidene group, and a hexylidene group.

Examples of the cycloalkylidene group represented by X1 include a cyclopropylidene group, a cyclobutylidene group, a cyclopentylidene group, a cyclohexylidene group, a cycloheptylidene group, a cyclooctylidene group, a cyclononylidene group, a cyclodecylidene group, a cycloundecylidene group, and a cyclododecylidene group.

Examples of the alkyl group represented by R 11 to R 18 include a methyl group, an ethyl group, an n-propyl group, an isopropyl group, an n-butyl group, a sec-butyl group, a tert-butyl group, and an isobutyl group.

(II)

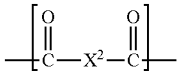

In the general formula (II), X2 represents a divalent group.

Examples of the divalent group represented by X2 include divalent groups derived from phenylene, naphthalene, and biphenyl, and a divalent group derived from biphenyl ether.

Examples of the structure represented by the general formula (I) include structures represented by the following formulas (I-1) to (I-10). Among these structures, at least one of the structures represented by Formula (I-1), Formula (I-2), Formula (I-3), and Formula (I-4) is preferable.

(I-1)

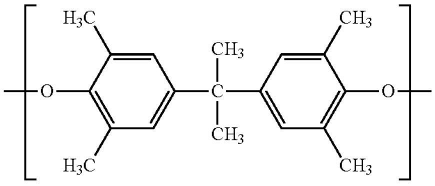

(I-2)

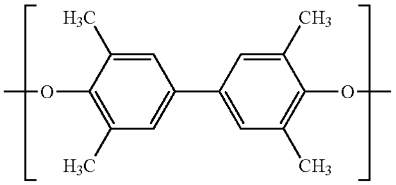

(I-3)

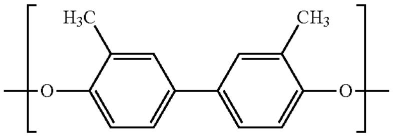

(I-4)

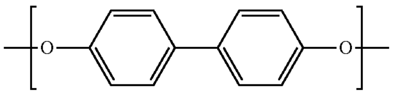

(I-5)

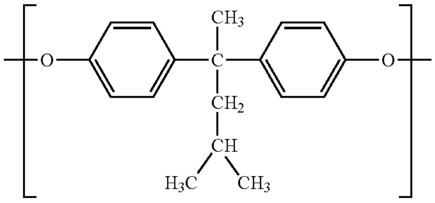

(I-6)

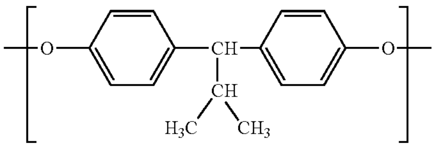

(I-7)

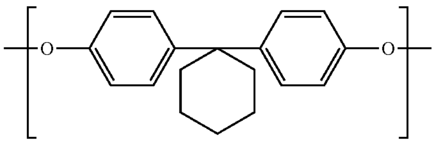

-continued (I-8)

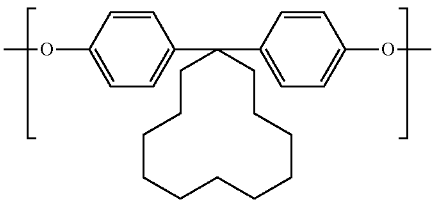

(I-9)

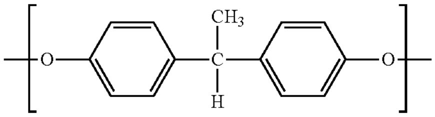

(I-10)

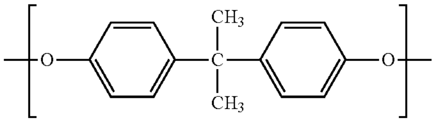

Examples of the structure represented by the general formula (II) include structures derived from dicarboxylic acids such as terephthalic acid, isophthalic acid, biphenyldicarboxylic acid, aliphatic dicarboxylic acid, and naphthalenedicarboxylic acid. Specific examples thereof include the following structural examples.

(II-1)

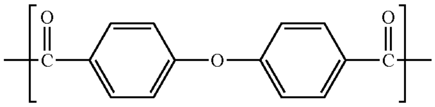

(II-2)

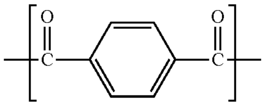

(II-3)

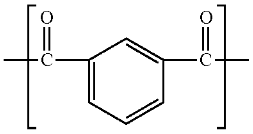

(II-4)

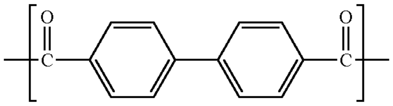

(II-5)

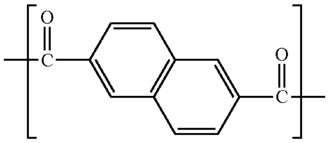

Among them, at least one of the structures represented by Formula (II-1), Formula (II-2), and Formula (II-3) is preferably contained.

[Martens Hardness of Surface Layer of Electrophotographic Photosensitive Member]

Measurement places of the Martens hardness of the surface layer of the electrophotographic photosensitive member are 10 places in total, specifically, arbitrary 1 place in each region obtained by equally dividing a longitudinal direction of the electrophotographic photosensitive member into 10. The Martens hardness of the surface layer of the electrophotographic photosensitive member can be measured by using a microhardness measurement device (trade name: PICODENTOR HM 500, manufactured by FISCHER INSTRUMENTS K.K). A square pyramid diamond indenter can be applied to the measurement sites under an environment at a temperature of 25° C. and a relative humidity of 50% to measure the Martens hardness under an indentation speed condition of the following formula (1).

$$dF/dt = 14 \text{ mN}/10 \text{ s} \qquad (1)$$

wherein F represents a force, and t represents a time. In the evaluation of the surface layer of the electrophotographic photosensitive member, the hardness when the indenter is pushed with a force of 7 mN is extracted from the measurement results, and values measured at the 10 places are averaged to obtain an average value (HMD) of the Martens hardness.

[Electrophotographic Photosensitive Member]

The electrophotographic photosensitive member according to the present invention has a support and a photosensitive layer, and has a surface layer containing a charge transporting substance and a resin. The photosensitive layer of the electrophotographic photosensitive member is mainly classified into (1) a laminate type photosensitive layer and (2) a monolayer type photosensitive layer. (1) The laminate type photosensitive layer includes a charge generation layer containing a charge generating substance and a charge transport layer containing a charge transporting substance. (2) The monolayer type photosensitive layer has a photosensitive layer containing both a charge generating substance and a charge transporting substance. In the electrophotographic photosensitive member according to the present invention, when the photosensitive layer is (1) a laminate type photosensitive layer, the charge transport layer serves as the surface layer, and when the photosensitive layer is (2) a monolayer type photosensitive layer, the photosensitive layer serves as the surface layer.

Examples of a method for producing the electrophotographic photosensitive member include a method in which a coating solution for each layer which will be described later is prepared, applied in an order of desired layers, and dried. At this time, examples of a method of applying the coating solution include a dip coating method, a spray coating method, a curtain coating method, and a spin coating method. Among them, a dip coating method is preferable from the viewpoint of efficiency and productivity.

Each layer will be described below.

<Electroconductive Layer>

In the electrophotographic photosensitive member according to the present invention, an electroconductive layer may be provided on the support. The electroconductive layer, when provided, can conceal scratches and irregularities on the surface of the support, and can control reflection of light on the surface of the support.

The electroconductive layer preferably contains electroconductive particle and a resin.

Examples of materials of the electroconductive particle include metal oxides, metals, and carbon black.

Examples of metal oxides include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Among them, it is preferable to use a metal oxide as the electroconductive particle, and in particular, it is more preferable to use titanium oxide, tin oxide, or zinc oxide.

When a metal oxide is used as the electroconductive particle, the surface of the metal oxide may be treated with a silane coupling agent or the like, or the metal oxide may be doped with an element such as phosphorus or aluminum or an oxide thereof.

In addition, the electroconductive particle may have a laminated configuration including core particle and a coating layer coating the particle. Examples of the core particle include titanium oxide, barium sulfate, and zinc oxide. Examples of the coating layer include metal oxides such as tin oxide.

When a metal oxide is used as the electroconductive particle, a volume average particle diameter thereof is preferably 1 to 500 nm, and more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

The electroconductive layer may further contain a masking agent such as a silicone oil, resin particle, or titanium oxide.

An average film thickness of the electroconductive layer is preferably 1 to 50 μm, and particularly preferably 3 to 40 μm.

The electroconductive layer can be formed by preparing an electroconductive layer coating solution containing each of the above-described materials and a solvent, forming a coating film made of the coating solution, and drying the coating film. Examples of the solvent used in the coating solution include an alcohol-based solvent, a sulfoxide-based solvent, a ketone-based solvent, an ether-based solvent, an ester-based solvent, and an aromatic hydrocarbon-based solvent. Examples of a dispersion method for dispersing the electroconductive particle in the electroconductive layer coating solution include methods using a paint shaker, a sand mill, a ball mill, and a liquid collision type high-speed disperser.

<Undercoat Layer>

In the electrophotographic photosensitive member according to the present invention, an undercoat layer may be provided on the support or the electroconductive layer. The undercoat layer, when provided, can enhance an adhesion function between the respective layers, and can impart a charge injection blocking function.

The undercoat layer preferably contains a resin. The undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamideimide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic anhydride group, and a carbon-carbon double bond group.

In addition, the undercoat layer may further contain an electron transporting substance, a metal oxide, a metal, an electroconductive polymer, and the like for the purpose of improving electrical characteristics. Among them, an electron transporting substance and a metal oxide are preferably used.

Examples of the electron transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound.

The undercoat layer may be formed as a cured film by using an electron transporting substance having a polymerizable functional group as the electron transporting substance and copolymerizing the electron transporting substance with the monomer having a polymerizable functional group described above.

Examples of the metal oxide include indium tin oxide, tin oxide, indium oxide, titanium oxide, zinc oxide, aluminum oxide, and silicon dioxide. Examples of the metal include gold, silver, and aluminum.

The undercoat layer may further contain an additive.

An average film thickness of the undercoat layer is preferably 0.1 to 50 μm, more preferably 0.2 to 40 μm, and particularly preferably 0.3 to 30 μm.

The undercoat layer can be formed by preparing an undercoat layer coating solution containing each of the above-described materials and a solvent, forming a coating film made of the coating solution, and drying and/or curing the coating film. Examples of the solvent used in the coating solution include an alcohol-based solvent, a ketone-based solvent, an ether-based solvent, an ester-based solvent, and an aromatic hydrocarbon-based solvent.

<Photosensitive Layer>

(1) Laminate Type Photosensitive Layer

The laminate type photosensitive layer includes a charge generation layer and a charge transport layer.

(1-1) Charge Generation Layer

The charge generation layer preferably contains a charge generating substance and a resin.

Examples of the charge generating substance include azo pigments, perylene pigments, polycyclic quinone pigments, indigo pigments, and phthalocyanine pigments. Among them, azo pigments and phthalocyanine pigments are preferable. Among the phthalocyanine pigments, oxytitanium phthalocyanine pigment, chlorogallium phthalocyanine pigment, and hydroxygallium phthalocyanine pigment are preferable.

A content of the charge generating substance in the charge generation layer is preferably 40 to 85 mass %, and more preferably 60 to 80 mass % with respect to a total mass of the charge generation layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Among them, a polyvinyl butyral resin is more preferable.

The charge generation layer may further contain additives such as an antioxidant and an ultraviolet absorber. Specific examples of the additives include a hindered phenol compound, a hindered amine compound, a sulfur compound, a phosphorus compound, and a benzophenone compound.

An average film thickness of the charge generation layer is preferably 0.1 to 1 μm, and more preferably 0.15 to 0.4 μm.

The charge generation layer can be formed by preparing a charge generation layer coating liquid containing each of the above materials and a solvent, forming a coating film made of the coating solution, and drying the coating film. Examples of the solvent used in the coating solution include an alcohol-based solvent, a sulfoxide-based solvent, a ketone-based solvent, an ether-based solvent, an ester-based solvent, and an aromatic hydrocarbon-based solvent.

The charge transport layer contains a charge transporting substance and a resin.

Examples of the charge transporting substance include a polycyclic aromatic compound, a heterocyclic compound, a hydrazone compound, a styryl compound, an enamine compound, a benzidine compound, a triarylamine compound, and resins having groups derived from these materials.

A content of the charge transporting substance in the charge transport layer is preferably 20 to 60 mass %, and more preferably 30 to 50 mass % with respect to the total mass of the charge transport layer.

Examples of the resin contained in the charge transport layer include a polyester resin and a polycarbonate resin. As described above, the polyester resin is preferably a polyester resin having structures represented by the general formulae (I) and (II), and the polycarbonate resin is preferably a polycarbonate resin having a structure represented by the general formula (III).

A content ratio (mass ratio) between the charge transporting substance and the resin in the charge transport layer is preferably 4:10 to 20:10, and more preferably 5:10 to 10:10.

The charge transport layer can be formed by forming a coating film of a charge transport layer coating solution prepared by dissolving a charge transporting substance and a resin in a solvent, and drying the coating film. Examples of the solvent used in the coating solution for forming the charge transport layer include an alcohol-based solvent, a sulfoxide-based solvent, a ketone-based solvent, an ether-based solvent, an ester-based solvent, and an aromatic hydrocarbon solvent.

In addition, the charge transport layer may contain additives such as an antioxidant, an ultraviolet absorber, a plasticizer, a leveling agent, a slipperiness imparting agent, and an abrasion resistance improver.

Specific examples of the additives include a hindered phenol compound, a hindered amine compound, a sulfur compound, a phosphorus compound, a benzophenone compound, a siloxane-modified resin, a silicone oil, fluororesin particle, polystyrene resin particle, polyethylene resin particle, alumina particle, and boron nitride particle.

An average film thickness of the charge transport layer is preferably 5 to 50 μm, more preferably 8 to 40 μm, and particularly preferably 10 to 30 μm.

The charge transport layer can be formed by preparing a charge transport layer coating solution containing each of the above-described materials and a solvent, forming a coating film made of the coating solution, and drying the coating film. Examples of the solvent used in the coating solution include an alcohol-based solvent, a ketone-based solvent, an ether-based solvent, an ester-based solvent, and an aromatic hydrocarbon-based solvent. Among these solvents, an ether-based solvent or an aromatic hydrocarbon-based solvent is preferable.

(2) Monolayer Type Photosensitive Layer

The monolayer type photosensitive layer can be formed by preparing a photosensitive layer coating solution containing a charge generating substance, a charge transporting substance, a resin, and a solvent, forming a coating film made of the coating solution, and drying the coating film. As the charge generating substance, the charge transporting substance, and the resin, the same materials as those exemplified for the materials in the "(1) Laminate type photosensitive layer" can be used.

An average film thickness of the monolayer type photosensitive layer is preferably 10 to 45 μm, and more preferably 25 to 35 μm.

Hereinafter, a method of measuring each physical property value according to the present invention will be described.

<Method of Measuring SPM Elastic Modulus>

Figure 4:
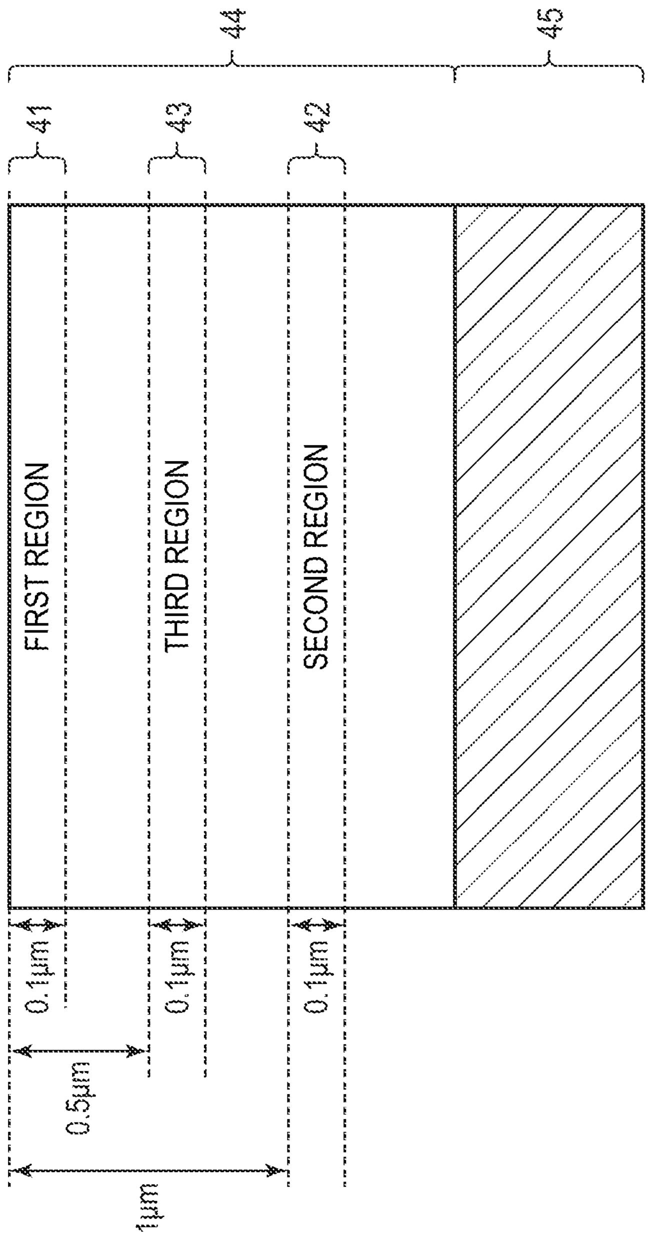
FIG. 4 is a cross-sectional view of the electrophotographic member (developing roller) according to the present invention.

First, a region of a cross section to be measured of the electrophotographic member (developing roller) is cut into a thin piece with a cryomicrotome (trade name: EMFC6, manufactured by Leica Microsystems) using a diamond knife in a state where the temperature is maintained at −110° C. Further, a sample having a size of 100 μm square and a width of 100 μm in a depth direction is prepared from the thin piece. FIG. 4 shows a schematic cross-sectional view of a surface layer 44 formed on an electroconductive substrate 45. In the present invention, as shown in FIG. 4, a region from an outer surface of the surface layer 44 to a depth of 0.1 μm is defined as a first region 41, a region from to a depth of 1.0 μm to a depth of 1.1 μm from the outer surface is defined as a second region 42, and a region from a depth of 0.5 μm to a depth of 0.6 μm from the outer surface is defined as a third region 43. In each region appearing in the cross section of the prepared sample, elastic moduli of a matrix containing a crosslinked urethane resin as a binder resin are measured. For the measurement, an SPM device (trade name: MFP-3D-Origin, manufactured by Oxford Instruments) and a probe (trade name: AC 160, manufactured by Olympus Corporation) are used. At this time, a force curve is measured 10 times, an arithmetic average of values at 8 points, excluding a maximum value and a minimum value, is determined, and the elastic moduli can be calculated based on the Hertz theory. The elastic moduli of the matrix in the first region 41, the second region 42, and the third region 43 are defined as E1, E2, and E3, respectively.

<Measurement of Major Diameters of External Additive a and External Additive B>

A photograph of the surface of the toner particle is taken with FE-SEMS-4800 (manufactured by Hitachi, Ltd.) at a magnification of 50,000 times. Major diameters of external additives were measured using the enlarged photograph, and the external additive having a length of 40 to 400 nm was defined as an external additive A. The external additive having a major diameter of 5 nm to 40 nm or less was defined as an external additive B. One hundred (100) or more measurements were performed for each of them, and an average value of major diameters of the external additive A was defined as an average major diameter Da of the external additive A, and an average value of major diameters of the external additive B was defined as an average major diameter Db of the external additive B.

The same applies to a toner containing a plurality of external additives on the surface of the toner particle. When a reflected electron image is observed with S-4800, an element of each fine particle can be specified using element analysis such as EDAX. In addition, it is possible to select the same type of fine particle based on shape characteristics and the like. By performing the above measurement on the same type of fine particle, the major diameter of each type of fine particle can be calculated.

<Dispersity Evaluation Index of External Additive A on Surface of Toner>

From observation images used in the measurement of the major diameters of the external additive A and the external additive B, calculation was performed as follows using image processing software "ImageJ".

Only external additives having a major diameter of 40 to 400 nm were selected on the software and binarized, a number n of external additives and barycentric coordinates thereof with respect to all the external additives were calculated, and a distance dnmin between each of the external additives and the closest external additive was calculated. When an average value of the closest distance between the external additives in the image is dave, the dispersity is represented by the following formula (2).

$$\text{Dispersity evaluation index} = \sqrt{\frac{\sum_j^n (dnmin - dave)^2}{n}} / dave \quad (2)$$

The dispersities of 50 randomly observed toners were determined by the above procedures, and an average value thereof was used as a dispersity evaluation index.

<Method of Measuring Coverages of External Additives A and B>

Coverages of the external additives A and B in the present invention are measured from the observation images from which the major diameters of the external additives A and B are determined. From the observed images, calculation was performed as follows using image processing software "ImageJ".

By particle analysis, only particle derived from the external additive A having a major diameter of 40 to 400 nm in the image are selected on the software. Next, an area of a selection screen is displayed by setting of the measurement. This value was divided by an area of a total visual field to obtain a coverage of external additive A in the visual field. This measurement was performed for 100 visual fields, and an average value of the measured values was used as a coverage of the external additive A. A coverage of the external additive B was also determined in the same manner as the coverage of the external additive A except that particle derived from the external additive B having a major diameter of 5 nm to 40 nm or less in the image were selected on the software.

<Method of Measuring Fixation Rates of External Additives A and B>

To 100 mL of ion-exchanged water, 160 g of sucrose (manufactured by Kishida Chemical Co., Ltd.) is added and placed in a hot water bath to prepare a concentrated sucrose solution. In a centrifuge tube (volume: 50 ml), 31 g of the concentrated sucrose solution and 6 mL of Contaminon N (10 mass % aqueous solution of neutral detergent for washing precision measuring instrument, at pH 7, composed of a nonionic surfactant, an anionic surfactant, and an organic builder; manufactured by Wako Pure Chemical Industries, Ltd.) are put to prepare a dispersion. To this dispersion, 1.0 g of a toner is added, and lumps of the toner are broken up with a spatula or the like.

A centrifuge tube is shaken with a shaker at 350 spm (strokes per min) for 20 minutes. After shaking, the solution is replaced with a glass tube for a swing rotor (volume: 50 mL), and separated with a centrifuge (H-9R, manufactured by Kokusan Co., Ltd.) at 3500 rpm and for 30 minutes. It is visually confirmed that the toner and the aqueous solution are sufficiently separated, and the toner separated in an uppermost layer is collected with a spatula or the like. The collected aqueous solution containing the toner is filtered by a vacuum filter and then dried in a dryer for 1 hour or longer.

The dried product was crushed with a spatula, and the surface of the toner particle was photographed at a magnification of 50,000 times with FE-SEMS-4800 (manufactured by Hitachi, Ltd.) in the same manner as the method of determining the major diameters of the external additives A and B. Thereafter, the coverage % of the external additive A after a water washing operation was determined in the same manner as in the "Method of measuring coverages of external additives A and B". Next, a fixation % was calculated by dividing the coverage % after the water washing operation by the coverage % of the external additive A before the water washing operation. A coverage of the external additive B can also be calculated in the same manner.

<Measurement of Particle Diameter of Toner>

A fine particle size distribution measuring device (trade name: Coulter Counter Multisizer 3) by a pore electric resistance method and dedicated software (trade name: Beckman Coulter Multisizer 3 Version 3.51, manufactured by Beckman Coulter, Inc.) are used. An aperture diameter is 100 μm, and measurement is performed in 25,000 effective measurement channels, and measurement data is analyzed and calculated. As an aqueous electrolytic solution used in the measurement, a solution obtained by dissolving special grade sodium chloride in ion-exchanged water so as to attain a concentration of about 1 mass %, for example, ISOTONII (trade name) manufactured by Beckman Coulter, Inc. can be used. Before measurement and analysis, the dedicated software is set as follows.

On the "screen for change of standard measurement method (SOM)" of the dedicated software, the total count number in a control mode is set to 50,000 particles, the number of measurements is set to 1, and the Kd value is set to a value obtained using (standard particle (10.0 μm), manufactured by Beckman Coulter, Inc.). A threshold value and a noise level are automatically set by pressing a threshold value/noise level measurement button. In addition, the current is set to 1,600 μA, the gain is set to 2, the electrolyte solution is set to ISOTONII (trade name), and the flash of the aperture tube after the measurement is checked.

On the "screen for conversion setting from pulse to particle diameter" of the dedicated software, the bin interval is set to logarithmic particle diameter, the particle diameter bin is set to 256 particle diameter bins, and the particle diameter range is set to 2 to 60 μm.

A specific measurement method is as follows.

(1) About 200 mL of the aqueous electrolyte solution is put in a 250-mL glass round-bottom beaker dedicated to Multisizer 3 and set on a sample stand, and stirring of a stirrer rod is performed counterclockwise at 24 rotations/second. Then, dirt and air bubbles in the aperture tube are removed by the "aperture flush" function of the analysis software.

(2) About 30 mL of the aqueous electrolyte solution is put in a 100-mL glass flat-bottom beaker. To the aqueous solution, added is about 0.3 mL of a diluent obtained by diluting Contaminon N (trade name) (10 mass % aqueous solution of neutral detergent for washing precision measuring instrument, manufactured by Wako Pure Chemical Industries, Ltd.) 3 times by mass with ion-exchanged water.

(3) Into a water tank of an ultrasonic disperser (trade name: Ultrasonic Dispersion System Tetora 150, manufactured by Nikkaki Bios Co., Ltd.) with an electrical output of 120 W, incorporating 2 oscillators with an oscillation frequency of 50 kHz in a state where their phases are shifted by 180 degrees, a predetermined amount of ion-exchanged water and about 2 mL of Contaminon N (trade name) are added.

(4) The beaker in the above (2) is set in a beaker fixing hole of the ultrasonic disperser, and the ultrasonic disperser is operated. Then, a height position of the beaker is adjusted so that a resonance state of a liquid level of the aqueous electrolytic solution in the beaker is maximized.

(5) While the aqueous electrolyte solution in the beaker in the above (4) is irradiated with ultrasonic waves, about 10 mg of the toner (particle) is added little by little to the aqueous electrolyte solution and dispersed. Then, the ultrasonic dispersion treatment is continued for additional 60 seconds. In the ultrasonic dispersion, a water temperature of the water tank is appropriately adjusted to 10 to 40° C.

(6) The aqueous electrolyte solution in the above (5) in which the toner (particle) is dispersed is added dropwise, using a pipette, to the round bottom beaker in the above (1) placed in the sample stand, and the measurement concentration is adjusted to about 5%. Then, the measurement is performed until a number of measurement particle reaches 50,000.

(7) The measurement data is analyzed with the dedicated software attached to the device to calculate a weight average particle diameter (D4). The "average diameter" on the analysis/volume statistical value (arithmetic mean) screen when graph/volume % is set in the dedicated software is the weight average particle diameter (D4). The "average diameter" on the "analysis/number statistics (arithmetic mean)" screen when graph/number % is set in the dedicated software is a number average particle diameter (D1).

Figure 2:
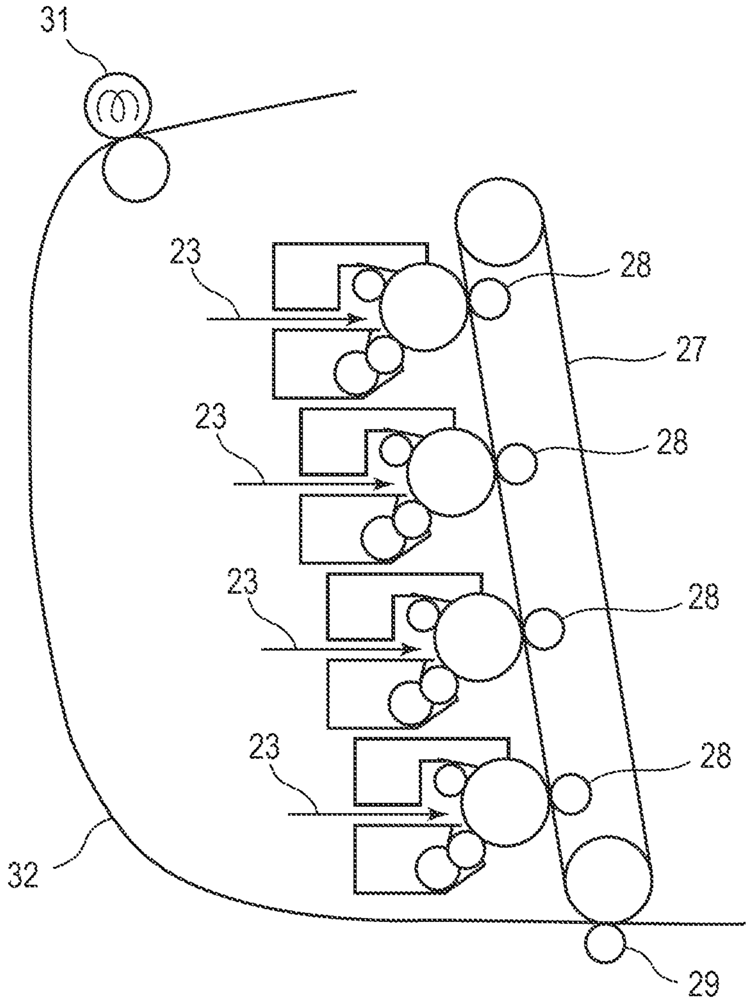
FIG. 2 is a schematic diagram of an electrophotographic image forming apparatus according to the present invention.
Figure 3:
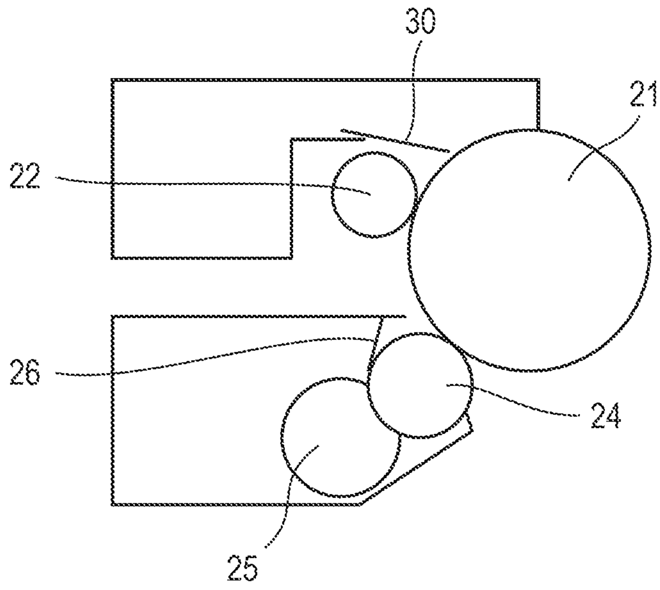
FIG. 3 is a schematic diagram of a process cartridge according to the present invention.

FIG. 2 is a schematic diagram of an electrophotographic image forming apparatus according to the present invention, and FIG. 3 is a schematic diagram of a process cartridge according to the present invention. In FIGS. 2 and 3, reference numeral 21 denotes an image carrier (electrophotographic photosensitive member), reference numeral 22 denotes a charging member, reference numeral 23 denotes exposure light, reference numeral 24 denotes a developing member, reference numeral 25 denotes a toner-supplying roller, reference numeral 26 denotes a developing blade, reference numeral 27 denotes an intermediate transfer belt, reference numeral 28 denotes a primary transfer member, reference numeral 29 denotes a secondary transfer member, reference numeral 30 denotes a cleaning member, reference numeral 31 denotes a fixing device, and reference numeral 32 denotes a conveyance route for a recording paper.

EXAMPLES

Hereinafter, the present invention will be specifically described with reference to Examples and Comparative Examples, but is not limited to these Examples and the like. Note that "part" and "%" indicated in the Examples and the Comparative Examples are all on a mass basis unless otherwise specified.

<Production Example of Toner>

<Production Example of Toner Particle>

A production example of toner particle will be described.

[1. Preparation of Binder Resin Particle Dispersion]

Mixed and dissolved were 89.5 parts of styrene, 9.2 parts of butyl acrylate, 1.3 parts of acrylic acid, and 3.2 parts of n-lauryl mercaptan. An aqueous solution of 1.5 parts of NEOGEN RK (manufactured by DKS Co. Ltd.) in 150 parts of ion-exchanged water was added to and dispersed in this solution. An aqueous solution of 0.3 parts of potassium persulfate in 10 parts of ion-exchanged water was further added while slowly stirring for 10 minutes. After nitrogen substitution, emulsion polymerization was performed at 70° C. for 6 hours. After completion of the polymerization, a reaction liquid was cooled to room temperature, and ion-exchanged water was added to obtain a resin particle dispersion having a solid content concentration of 12.5 mass % and a volume-based median diameter of 0.2 μm.

[2. Preparation of Mold Release Agent Dispersion]

In 385 parts of ion-exchanged water, 100 parts of a mold release agent (behenyl behenate, melting point: 72.1° C.) and 15 parts of NEOGEN RK were mixed and dispersed for about 1 hour using a wet jet mill JN 100 (manufactured by JOKOH CO., LTD) to obtain a mold release agent dispersion. A concentration of the mold release agent dispersion was 20 mass %.

[3. Preparation of Colorant Dispersion]

In 885 parts of ion-exchanged water, 100 parts of carbon black "Nipex 35 (manufactured by Orion Engineered Carbons)" as a colorant and 15 parts of NEOGEN RK were mixed and dispersed for about 1 hour using a wet jet mill JN 100 to obtain a colorant dispersion.

[4. Preparation of Toner Particle]

Using a homogenizer (ULTRA-TURRAX T50, manufactured by IKA), 265 parts of the resin particle dispersion, 10 parts of a wax dispersion, and 10 parts of a colorant dispersion were dispersed. A temperature in a vessel was adjusted to 30° C. while stirring, and 1 mol/L hydrochloric acid was added to adjust the pH to 5.0. After the solution was left for 3 minutes, the temperature was started to be raised, and raised up to 50° C. to produce associated particle. In this state, a particle diameter of the associated particle was measured with "Coulter Counter Multisizer 3" (registered trademark, manufactured by Beckman Coulter, Inc.). At a time point when the weight average particle diameter reached 6.8 μm, a 1 mol/L aqueous sodium hydroxide solution was added to adjust the pH to 8.0, and particle growth was stopped.

Thereafter, the temperature was raised up to 95° C. to fuse and spheroidize the associated particle. When an average circularity reached 0.980, the temperature was started to be lowered, and lowered to 30° C. to obtain a toner particle dispersion.

Hydrochloric acid was added to the obtained toner particle dispersion to adjust the pH to 1.5 or less, the mixture was stirred and left for 1 hour, and then solid-liquid separation was performed with a pressure filter to obtain a toner cake. This toner cake was re-slurried with ion-exchanged water to form a dispersion again, and then solid-liquid separation was performed with the above-described filter. Re-slurrying and solid-liquid separation were repeated until an electric conductivity of a filtrate reached 5.0 μS/cm or less, and then solid-liquid separation was finally performed to obtain a toner cake. The obtained toner cake was dried with a flash jet dryer (manufactured by Seishin Enterprise Co., Ltd.). Drying conditions were a blowing temperature of 90° C., a dryer an outlet temperature of 40° C., and a supply rate of the toner cake adjusted to a rate at which an outlet temperature did not deviate from 40° C. according to a water content of the toner cake. Further, fine coarse powder was cut using a multi-division classifier utilizing the Coanda effect to obtain toner particle.

<Production Example of Silica Particle 1>

In a 3-liter glass reactor equipped with a stirrer, a dropping funnel, and a thermometer, 589.6 g of methanol, 42.0 g of water, and 47.1 g of 28 mass % aqueous ammonia were added and mixed. The obtained solution was adjusted to have a temperature of 35° C., and 1100.0 g (7.23 mol) of tetramethoxysilane and 395.2 g of 5.4 mass % aqueous ammonia were simultaneously added while stirring. Tetramethoxysilane and aqueous ammonia were added dropwise over 6 hours and 5 hours, respectively. After completion of the dropwise addition, stirring was continued for additional 0.5 hours to perform hydrolysis, thereby obtaining a methanol-water dispersion of hydrophilic spherical sol-gel silica fine particle. Subsequently, an ester adapter and a cooling tube were attached to the glass reactor, and the dispersion was sufficiently dried at 80° C. under reduced pressure. The above step was performed several tens of times, and the obtained silica particle was subjected to a crushing treatment with a pulverizer (manufactured by Hosokawa Micron Corporation).

Thereafter, 500 g of silica particle was charged into a polytetrafluoroethylene internal tubular type stainless steel autoclave having an internal volume of 1000 ml. After the inside of the autoclave was replaced with nitrogen gas, 0.5 g of HMDS (hexamethyldisilazane) and 0.1 g of water were atomized with a two-fluid nozzle and sprayed onto the silica powder so as to be uniform, while a stirring blade attached to the autoclave was rotated at 400 rpm. After stirring for 30 minutes, the autoclave was sealed and heated at 200° C. for 2 hours. Subsequently, the inside of the system was depressurized while being heated for deammoniation, thereby obtaining silica particle intermediate 1.

Silica particle 1 was obtained by hydrophobizing 100 parts of the silica particle intermediate with 30 parts of dimethyl silicone oil. Table 1 shows the physical characteristics of the silica particle 1.

<Production Example of Toner 1>

Mixing Step 1

The toner particle of 100 parts and the silica particle 1 of 0.75 parts were charged in a state in which a water temperature in a jacket of the FM mixer (FM 10C model, manufactured by NIPPON COKE & ENGINEERING CO., LTD) was stable at 25° C.±1° C. Mixing was started at a rotation speed of 400 rpm of a rotary blade, and mixing was performed for 2 minutes while controlling the water temperature and the flow rate in the jacket so that the temperature in the tank was stabilized at 25° C.±1° C.

Mixing Step 2

Following the mixing step 1, the silica particle 9 of 1.5 parts was added in a state in which a water temperature in a jacket of the FM mixer was stable at 40° C.±1° C. Mixing was started at a rotation speed of 3,600 rpm of a rotary blade, and mixing was performed for 10 minutes while controlling the water temperature and the flow rate in the jacket so that the temperature in the tank was stabilized at 40° C.±1° C.

Mixing Step 3

Following the mixing step 2, the silica particle 1 of 0.75 parts was added in a state in which a water temperature in a jacket of the FM mixer was stable at 25° C.±1° C. Mixing was started at a rotation speed of 800 rpm of a rotary blade, mixing was performed for 10 minutes while controlling the water temperature and the flow rate in the jacket so that the temperature in the tank was stabilized at 25° C.±1° C., and then sieving was performed with a mesh having an opening of 75 μm to obtain a toner 1. Conditions for production of the toner 1 are shown in Table 2, and physical properties thereof are shown in Table 3.

<Production Example of Silica Particle 2>

In the production example of the silica particle 1, the amount of methanol used first was changed to 491.3 g. Further, the dropping time of tetramethoxysilane was changed to 7 hours, and the dropping time of 5.4 mass % aqueous ammonia was changed to 6 hours. Major diameter of the silica particle was adjusted by such an operation. In addition, when a surface treatment with HMDS was performed so that an amount of carbon was the same as that of the silica particle intermediate 1, amounts of HMDS and water were adjusted. Silica particle 2 was obtained in the same manner as silica particle 1 except for the above changes. Physical properties of the obtained silica particle 2 are shown in Table 1.

<Production Examples of Silica Particle 3, 5, and 7>

In the production example of the silica particle 1, the amount of methanol used first was changed to 634.0 g, 842.1 g, and 883.5 g, respectively. Further, the dropping time of tetramethoxysilane was changed to 7 hours, 6 hours, and 5 hours, respectively, and the dropping time of 5.4 mass % aqueous ammonia was changed to 6 hours, 5 hours, and 4 hours, respectively. Major diameter of the silica particle was adjusted by such an operation. In addition, when a surface treatment with HMDS was performed so that an amount of carbon was the same as that of the silica particle intermediate 1, amounts of HMDS and water were adjusted. Silica particle 3, 5 and 7 were obtained in the same manner as silica particle 1 except for the above changes. Physical properties of the obtained silica particle 3, 5 and 7 are shown in Table 1.

<Production Examples of Silica Particle 4 and 6>

In the production example of the silica particle 1, the amount of methanol used first was changed to 405.5 g and 385.5 g, respectively. Further, the dropping time of tetramethoxysilane was changed to 7 hours in each case, and the dropping time of 5.4 mass % aqueous ammonia was changed to 6 hours in each case. Major diameters of the silica particle were adjusted by such an operation. In addition, when surface treatment with HMDS was performed so that an amount of carbon was the same as that of the silica particle intermediate 1, the amounts of HMDS and water were adjusted. Silica particle 4 and 6 were obtained in the same manner as silica particle 1 except for the above changes. Physical properties of the obtained silica particle 4 and 6 are shown in Table 1.

<Production Example of Silica Particle 8>

In the production example of the silica particle 1, the amount of methanol used first was changed to 382.7 g. In addition, the amount of aqueous ammonia used was changed to 37.1 g of 28 mass % aqueous ammonia. Further, the dropping time of tetramethoxysilane was changed to 7 hours in each case, and the dropping time of 5.4 mass % aqueous ammonia was changed to 6 hours in each case. Major diameters of the silica particle were adjusted by such an operation. In addition, when a surface treatment with HMDS was performed so that an amount of carbon was the same as that of the silica particle intermediate 1, amounts of HMDS and water were adjusted. Silica particle 8 was obtained in the same manner as silica particle 1 except for the above changes. Physical properties of the obtained silica particle 8 are shown in Table 1.

<Production Examples of Silica Particle 9 and 10>

In the production example of the silica particle 1, the amount of methanol used first was changed to 1020.0 g and 980.0 g, respectively. Further, the dropping time of tetramethoxysilane was changed to 4 hours and 3 hours, respectively, and the dropping time of 5.4 mass % aqueous ammonia was changed to 3.5 hours and 3 hours, respectively. Major diameter of the silica particle was adjusted by such an operation. In addition, when surface treatment with HMDS was performed so that an amount of carbon was the same as that of the silica particle intermediate 1, the amounts of HMDS and water were adjusted. Silica particle 9 and 10 were obtained in the same manner as silica particle 1 except for the above changes. Physical properties of the obtained silica particle 9 and 10 are shown in Table 1.

<Production Examples of Toners 2 to 20>

Toners 2 to 20 were prepared according to the production example of the toner 1 except for the production conditions and formulation shown in Table 2. Physical properties of the obtained toners 2 to 20 are shown in Table 3.

TABLE 1

| Silica particle | Average major diameter [nm] |
|---|---|
| Silica particle 1 | 100 |
| Silica particle 2 | 200 |
| Silica particle 3 | 80 |
| Silica particle 4 | 300 |
| Silica particle 5 | 45 |
| Silica particle 6 | 380 |
| Silica particle 7 | 35 |
| Silica particle 8 | 500 |
| Silica particle 9 | 10 |
| Silica particle 10 | 20 |

TABLE 2

| Toner No. | Mixing step 1 | | | | Mixing step 2 | | | | Mixing step 3 | | | |
|---|---|---|---|---|---|---|---|---|---|---|---|---|
| | Silica particle | Addition amount [part] | rotation speed [rpm] | Time [min] | Silica particle | Addition amount [part] | rotation speed [rpm] | Time [min] | Silica particle | Addition amount [part] | rotation speed [rpm] | Time [min] |
| Toner 1 | Silica particle 1 | 0.75 | 400 | 2 | Silica particle 9 | 1.50 | 3600 | 10 | Silica particle 1 | 0.75 | 800 | 10 |
| Toner 2 | Silica particle 2 | 0.75 | 400 | 2 | Silica particle 9 | 1.50 | 3600 | 10 | Silica particle 2 | 0.75 | 800 | 10 |
| Toner 3 | Silica particle 3 | 0.75 | 400 | 2 | Silica particle 9 | 1.50 | 3600 | 10 | Silica particle 3 | 0.75 | 800 | 10 |
| Toner 4 | Silica particle 4 | 0.75 | 400 | 2 | Silica particle 9 | 1.50 | 3600 | 10 | Silica particle 4 | 0.75 | 800 | 10 |
| Toner 5 | Silica particle 5 | 0.50 | 400 | 2 | Silica particle 9 | 1.50 | 3600 | 10 | Silica particle 5 | 0.50 | 800 | 10 |
| Toner 6 | Silica particle 6 | 1.50 | 400 | 2 | Silica particle 9 | 1.50 | 3600 | 10 | Silica particle 6 | 1.50 | 800 | 10 |
| Toner 7 | Silica particle 2 | 0.55 | 400 | 2 | Silica particle 9 | 1.50 | 3600 | 10 | Silica particle 2 | 0.55 | 800 | 10 |
| Toner 8 | Silica particle 2 | 1.75 | 400 | 2 | Silica particle 9 | 1.50 | 3600 | 10 | Silica particle 2 | 1.75 | 800 | 10 |
| Toner 9 | Silica particle 2 | 2.40 | 400 | 2 | Silica particle 9 | 1.50 | 3600 | 10 | Silica particle 2 | 2.40 | 800 | 10 |
| Toner 10 | Silica particle 2 | 1.50 | 400 | 2 | Silica particle 9 | 1.50 | 1600 | 15 | — | — | — | — |
| Toner 11 | Silica particle 2 | 1.50 | 400 | 2 | Silica particle 9 | 1.50 | 3600 | 20 | — | — | — | — |
| Toner 12 | Silica particle 2 | 0.75 | 400 | 2 | Silica particle 9 | 1.00 | 3600 | 10 | Silica particle 2 | 0.75 | 800 | 10 |
| Toner 13 | Silica particle 2 | 0.75 | 400 | 2 | Silica particle 10 | 2.00 | 3600 | 10 | Silica particle 2 | 0.75 | 800 | 10 |
| Toner 14 | Silica particle 2 | 0.75 | 400 | 2 | Silica particle 9 | 0.70 | 3600 | 10 | Silica particle 2 | 0.75 | 800 | 10 |
| Toner 15 | Silica particle 2 | 0.75 | 400 | 2 | Silica particle 10 | 2.00 | 3600 | 10 | Silica particle 2 | 0.75 | 800 | 10 |
| Toner 16 | Silica particle 2 | 1.50 | 400 | 2 | Silica particle 9 | 1.50 | 1600 | 20 | — | — | — | — |
| Toner 17 | Silica particle 2 | 1.50 | 400 | 2 | Silica particle 9 | 1.50 | 3600 | 15 | — | — | — | — |
| Toner 18 | Silica particle 7 | 0.75 | 400 | 2 | Silica particle 9 | 1.50 | 3600 | 10 | Silica particle 7 | 0.75 | 800 | 10 |
| Toner 19 | Silica particle 8 | 0.75 | 400 | 2 | Silica particle 9 | 1.50 | 3600 | 10 | Silica particle 8 | 0.75 | 800 | 10 |
| Toner 20 | Silica particle 2 | 0.35 | 400 | 2 | Silica particle 9 | 1.50 | 3600 | 10 | Silica particle 2 | 0.35 | 800 | 10 |

TABLE 3

| Toner No. | Coverage: Coverage of external additive A [%] | Coverage: Coverage of external additives A and B [%] | Fixation rate: Fixation rate of silica particle A [%] | Fixation rate: Fixation rate of silica particle B [%] | Dispersity of silica particle A | Volume average particle diameter of toner [μm] |
|---|---|---|---|---|---|---|
| Toner 1 | 10.0 | 70.0 | 61 | 85 | 0.8 | 6.8 |
| Toner 2 | 6.0 | 70.0 | 60 | 85 | 0.8 | 6.8 |
| Toner 3 | 13.5 | 78.0 | 63 | 86 | 0.7 | 6.8 |
| Toner 4 | 5.0 | 68.0 | 55 | 78 | 1.2 | 6.8 |
| Toner 5 | 27.0 | 80.0 | 68 | 88 | 0.7 | 6.8 |
| Toner 6 | 8.5 | 65.0 | 42 | 75 | 1.8 | 6.8 |
| Toner 7 | 3.5 | 63.0 | 63 | 90 | 0.7 | 6.8 |
| Toner 8 | 18.0 | 92.0 | 56 | 70 | 1.2 | 6.8 |
| Toner 9 | 25.0 | 95.0 | 53 | 72 | 1.8 | 6.8 |
| Toner 10 | 5.8 | 72.0 | 65 | 85 | 0.5 | 6.8 |
| Toner 11 | 6.2 | 70.0 | 43 | 88 | 1.9 | 6.8 |
| Toner 12 | 6.0 | 63.0 | 62 | 90 | 0.8 | 6.8 |
| Toner 13 | 6.1 | 98.0 | 57 | 72 | 0.8 | 6.8 |
| Toner 14 | 6.0 | 58.0 | 63 | 85 | 0.7 | 6.8 |
| Toner 15 | 5.9 | 80.0 | 40 | 65 | 0.7 | 6.8 |
| Toner 16 | 6.3 | 71.0 | 67 | 86 | 0.4 | 6.8 |
| Toner 17 | 5.6 | 70.0 | 52 | 80 | 2.1 | 6.8 |
| Toner 18 | 35.0 | 80.0 | 89 | 85 | 1.5 | 6.8 |
| Toner 19 | 2.5 | 68.0 | 32 | 65 | 2.3 | 6.8 |
| Toner 20 | 2.8 | 70.0 | 71 | 85 | 0.7 | 6.8 |

<Production Example of Developing Roller 1>

[1. Preparation of electroconductive substrate]

A primer (trade name: DY35-051, manufactured by Dow Corning Toray Co., Ltd.) was applied to a core metal made of SUS 304 having an outer diameter of 6 mm and a length of 270 mm, and heated at a temperature of 150° C. for 20 minutes. The core metal was placed concentrically in a cylindrical mold having an inner diameter of 12.0 mm.

As a material of an intermediate layer, an addition type silicone rubber composition obtained by mixing materials shown in the following Table 4 with a kneader (trade name: Trimix TX-15, manufactured by Inoue Mfg. Co., Ltd.) was injected into a mold heated to a temperature of 115° C. After injection of the materials, the mixture was heat-molded at a temperature of 120° C. for 10 minutes, and the resultant product was cooled to room temperature, and then demolded from the mold to obtain an electroconductive substrate (elastic roller) having an intermediate layer having a thickness of 3.0 mm formed on an outer periphery of the core metal.

TABLE 4

| Material | Parts by mass |
|---|---|
| Liquid dimethylpolysiloxane having two or more silicon atom-bonded alkenyl groups in one molecule (Trade name: SF3000E, viscosity: 10,000 cP, vinyl group equivalent: 0.05 mmol/g, manufactured by KCC) | 100 |
| Platinum-based catalyst (Trade name: SIP6832.2, manufactured by Gelest) | 0.048 |
| Liquid dimethylpolysiloxane having two or more silicon atom-bonded hydrogen atoms in one molecule (Trade name: SF6000P, Si-H group equivalent: 15.5 mmol/g, manufactured by KCC) | 0.5 |
| Carbon black (Trade name: TOKABLACK #7360SB, manufactured by Tokai Carbon Co., Ltd.) | 6 |

[Formation of Surface Layer]

In formation of a surface layer, first, a resin layer is formed. As materials of the resin layer, materials, other than roughness-forming particle, in the following Table 5 were stirred and mixed. Thereafter, the mixture was dissolved in methyl ethyl ketone (manufactured by Kishida Chemical Co., Ltd.) so as to attain a solid content concentration of 30 mass %, mixed, and then uniformly dispersed with a sand mill. Methyl ethyl ketone was added to this mixed liquid to adjust the solid content concentration to 25 mass %, and materials shown in the column of roughness-forming particle in Table 5 were added thereto and stirred and dispersed with a ball mill to obtain a coating material 1 for a resin layer. The elastic roller was immersed in the coating material for coating in such a manner that the film thickness of a resin layer was about 15 μm. Thereafter, the coating film was heated at a temperature of 135° C. for 60 minutes to be dried, and cured to form a resin layer.

TABLE 5

| Material | Parts by mass |
|---|---|
| Polyether polyol (Trade name: PTGL 1000, manufactured by Hodogaya Chemical Co., Ltd.) | 100 |
| Polymeric MDI (Trade name: MR-400, manufactured by Tosoh Corporation) | 37.2 |
| Carbon black (Trade name: SUNBLACK X15, manufactured by Asahi Carbon Co., Ltd.) | 29.3 |
| Polyether monool (Trade name: NEW POLE 50HB 100, manufactured by Sanyo Chemical Industries, Ltd.) | 3 |
| Modified silicone oil (Trade name: TSF 4445, manufactured by Momentive Performance Materials Japan) | 0.6 |
| Roughness-forming particle (Trade name: Dynamic Beads UCN-5090, manufactured by Dainichiseika Color & Chemicals Mfg.Co.,Ltd) | 17.6 |

Subsequently, impregnation with an acrylic monomer and a curing treatment are performed by the following methods. As materials of an impregnation treatment liquid for impregnation treatment, materials shown in the following Table 6 were dissolved and mixed. The elastic roller on which the resin layer was formed was immersed in the impregnation treatment liquid for 2 seconds to be treated, thereby impregnating the elastic roller with an acrylic monomer component. Thereafter, air drying was performed at normal temperature for 30 minutes, and drying was performed at 90° C. for 1 hour to volatilize the solvent. The dried elastic roller was irradiated with ultraviolet rays while being rotated so that the integrated light amount was 15,000 mJ/cm$^2$ to cure the acrylic monomer, thereby forming a surface layer. A high-pressure mercury lamp (trade name: Handy Type UV Curing Device, manufactured by Mario Network Co., Ltd.) was used as the ultraviolet irradiation device.

TABLE 6

| Material | Parts by mass |
|---|---|
| Bifunctional acrylic monomer (Trade name: EBECRYL 145, DAICEL-ALLNEX LTD.) | 5 |
| Photoinitiator (Trade name: IRGACURE 184 BASF) | 0.25 |
| Solvent (Trade name: Methyl ethyl ketone, manufactured by Kishida Chemical Co., Ltd.) | 100 |
| Polyether monool (Trade name: NEW POLE 50HB-100, manufactured by Sanyo Chemical Industries, Ltd.) | 3 |

The obtained developing roller was evaluated as follows.

[Evaluation Method]

<Measurement of SPM Elastic Modulus>

The elastic moduli E1 to E3 in the first region to the third region were determined by the above-described method of measuring SPM elastic moduli. Further, the obtained elastic moduli E1 and E3 were substituted into the left side of the following formula (3) to obtain a value of (E1−E3)/E3. The results are shown in Table 7.

$$(E1-E3)/E3>1 \quad (3)$$

TABLE 7

| Developing roller No. | Elastic modulus E1 [Mpa] | E3 [Mpa] | E2 [Mpa] | (E1-E3)/E3 | Film thickness [μm] |
|---|---|---|---|---|---|
| 1 | 350 | 40 | 20 | 7.75 | 15 |
| 2 | 210 | 50 | 12 | 3.20 | 15 |
| 3 | 220 | 80 | 65 | 1.75 | 15 |
| 4 | 370 | 100 | 40 | 2.70 | 15 |
| 5 | 4300 | 1000 | 100 | 3.30 | 15 |
| 6 | 300 | 250 | 150 | 0.20 | 15 |
| 7 | 400 | 350 | 60 | 0.14 | 15 |
| 8 | 20 | 12 | 9 | 0.67 | 15 |
| 9 | 20 | 20 | 20 | 0 | 15 |
| 10 | 4000 | 3500 | 2500 | 0.14 | 15 |
| 11 | 7000 | 7000 | 7000 | 0 | 15 |

<Production Examples of Developing Rollers 2 to 8 and 10>

In the same manner as in the production of the developing roller 1, each resin layer coating material was prepared with the materials shown in Table 8, each impregnation treatment liquid was prepared with the materials shown in Table 9, and each developing roller was prepared using the combinations of resin layer coating material and impregnation treatment liquid shown in Table 10. The evaluation results are shown in Table 7.

<Production Example of Developing Roller 9>

Except that the surface modifier A described in Examples of Japanese Patent Application Laid-Open No. 2017-049282 was used as a material of the resin layer coating material, and that the resin layer coating material was prepared using the materials shown in Table 8, an impregnation treatment liquid was prepared using the materials shown in Table 9, and a developing roller was prepared using the combination of resin layer coating material and impregnation treatment solution as shown in Table 10. The evaluation results are shown in Table 7.

Production Example of Developing Roller 11

Comparative Example 5

A synthesis liquid containing a photopolymerizable polymer A described in Examples of Japanese Patent Application Laid-Open No. 2007-171666 was obtained. Specifically, 1.66 g (0.36 mmol) of acrylate-modified silicone oil ("X-22-174DX" manufactured by Shin-Etsu Chemical Co., Ltd.), 5.61 g (13 mmol) of 2-(perfluorohexyl) ethyl acrylate ("R-1620" manufactured by DAIKIN INDUSTRIES, LTD), 1.69 g (13 mmol) of 2-hydroxyethyl methacrylate (manufactured by Tokyo Chemical Industry Co., Ltd.), 7.37 g (73.64 mmol) of methyl methacrylate (manufactured by Junsei Chemical Co., Ltd.), 1.24 g (4 mmol) of dimethyl 1,1'-azobis(1-cyclohexanecarboxylate) ("VE-73" manufactured by FUJIFILM Wako Pure Chemical Corporation), and 75 g of methyl ethyl ketone (MEK) were charged into a 100-mL reaction flask, bubbled with nitrogen for 5 minutes while stirring, and then polymerized at an internal liquid temperature of 75° C. for 7 hours to produce a copolymer. Thereafter, 2.02 g (13 mmol) of 2-isocyanatoethyl methacrylate ("Karenz MOI" manufactured by Showa Denko K.K) and 0.001 g of bismuth tris(2-ethylhexanoate) (manufactured by FUJIFILM Wako Pure Chemical Corporation) were added to this reaction flask, and then the mixture was stirred at an internal liquid temperature of 75° C. for 10 hours to react the hydroxyl group of the polymerization unit based on 2-hydroxyethyl methacrylate in the copolymer with the isocyanate group of 2-isocyanatoethyl methacrylate, thereby obtaining a solution containing the photopolymerizable polymer A. A resin layer coating material was prepared using the materials shown in Table 8, an impregnation treatment liquid was prepared using the materials shown in Table 9, and a developing roller was prepared using the combination as shown in Table 10, in the same manner as in Example 1, except that this material was used as the material of the impregnation treatment agent. The evaluation results are shown in Table 7.

TABLE 8

| Classification | Material name | Resin layer coating material No. 1 | 2 | 3 | 4 | 5 | 6 |
|---|---|---|---|---|---|---|---|
| Polyol | PTGL1000 | 100 | — | 100 | 100 | — | 100 |
| | PTGL3500 | — | 100 | — | — | 100 | — |
| Isocyanate | MR-400 | 37.2 | 6.3 | 37.2 | 37.2 | 3.6 | 37.2 |
| Carbon black | SUNBLACK X15 | 29.3 | 26.3 | 29.3 | 29.3 | 26.1 | 29.3 |
| Monool component | 50HB-100 | 3 | 3 | 3 | 3 | 3 | 3 |

TABLE 8-continued

| Classification | Material name | Resin layer coating material No. 1 | 2 | 3 | 4 | 5 | 6 |
|---|---|---|---|---|---|---|---|
| Modified silicone compound | TSF4445 | 0.6 | 1.1 | — | 3.6 | — | — |
| Acrylate-derived copolymer | Surface modifier A | — | — | — | — | — | — |

*The figures in the table represent the blending amount of each material in parts by mass.
*The materials listed in the table are as follows.
"PTGL 1000": product name; Polyol manufactured by Hodogaya Chemical Co., Ltd.
"PTGL 3500": product name; Polyol manufactured by Hodogaya Chemical Co., Ltd.
"MR-400" ("Millionate MR-400"): product name; isocyanate compound (polymeric MDI) manufactured by Tosoh Corporation
"SUNBLACKX 15" (product name; carbon black (volatile content: 2.1%) manufactured by Asahi Carbon Co., Ltd.
"50HB-100" (NEW POLE 50HB-100): product name; monool(poly(oxyethyleneoxypropylene)glycol monobutyl ether, molecular weight Mn = 510) manufactured by Sanyo Chemical Industries, Ltd.
"TSF 4445": product name; modified silicone compound manufactured by Momentive Performance Materials Japan
Surface modifier A: surface modifier A described in Examples of Japanese Patent Application Laid-Open No. 2017-049282

TABLE 9

| Classification | Material name | Impregnation treatment solution No. 1 | 2 | 3 | 4 | 5 |
|---|---|---|---|---|---|---|
| Acrylic monomer | EBECRYL145 | 5 | — | — | — | — |
| | TMPTA | — | 5 | — | — | — |
| | EBECRYL11 | — | — | — | 5 | — |
| | Pentaerythritol triacrylate | — | — | — | — | 23.8 |
| | NK ester 9G | — | — | 5 | — | — |
| | NK ester 14G | — | — | — | — | — |
| | EBECRYL40 | — | — | — | — | — |
| Acrylic polymer | Photopolymerizable polymer A solution (20 mass % solution) | — | — | — | — | 1.19 |
| Initiator | IRGACURE184 | 0.25 | 0.25 | 0.25 | 0.25 | 1.19 |
| Solvent | Methyl ethyl ketone | 100 | 100 | 100 | 100 | 100 |

*The figures in the table represent the blending amount of each material in parts by mass.
*The materials listed in the table are as follows.
EBECRYL 145: bifunctional acrylic monomer manufactured by DAICEL-ALLNEX LTD.
TMPTA: trifunctional acrylic monomer manufactured by DAICEL-ALLNEX LTD.
EBECRYL 11: bifunctional acrylic monomer manufactured by DAICEL-ALLNEX LTD.
Pentaerythritol triacrylate: trifunctional acrylic monomer manufactured by Shin Nakamura Chemical Co., Ltd.
NK ester 9G: bifunctional acrylic monomer manufactured by Shin Nakamura Chemical Co., Ltd.
NK ester 14G: bifunctional acrylic monomer manufactured by Shin Nakamura Chemical Co., Ltd.
Photopolymerizable polymer A solution (20 mass % solution): photopolymerizable acrylic polymer described in Examples of Japanese Patent Application Laid-Open No. 2007-171666
EBECRYL 40: tetrafunctional acrylic monomer manufactured by DAICEL-ALLNEX LTD.
IRGACURE 184: Photopolymerization initiator manufactured by BASF SE

TABLE 10

| Developing roller No. | Resin layer coating material | Impregnation treatment solution |
|---|---|---|
| 1 | 1 | 1 |
| 2 | 3 | 2 |
| 3 | 1 | 5 |
| 4 | 2 | 1 |
| 5 | 2 | 2 |
| 6 | 4 | 1 |
| 7 | 8 | 1 |
| 8 | 5 | 3 |
| 9 | 11 | — |

TABLE 10-continued

| Developing roller No. | Resin layer coating material | Impregnation treatment solution |
|---|---|---|
| 10 | 4 | 2 |
| 11 | 4 | 4 |

<Production Example of Photosensitive Member>

<Production Example of Polyester Resin 1>

A dicarboxylic acid halide (29.5 g) represented by the following formula:

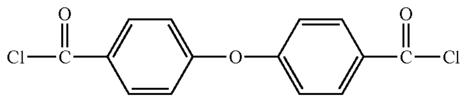 [SMILES: O=C(Cl)c1ccc(Oc2ccc(C(=O)Cl)cc2)cc1]

was dissolved in dichloromethane to prepare an acid halide solution. Separately, 24.4 g of a diol represented by the following formula:

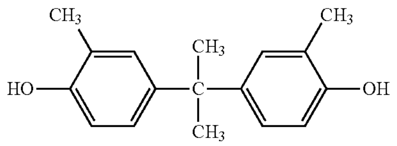

was dissolved in a 10% aqueous sodium hydroxide solution, tributylbenzylammonium chloride was added as a polymerization catalyst, and the mixture was stirred to prepare a diol compound solution.

Next, an acid halide solution was added to the diol compound solution under stirring to initiate polymerization. The polymerization was performed under stirring for 3 hours while the reaction temperature was maintained at 25° C. or lower.

p-t-butylphenol was added as a polymerization modifier during the polymerization reaction. Thereafter, the polymerization reaction was terminated by addition of acetic acid, and washing with water was repeated until the aqueous phase became neutral.

After washing, a dichloromethane solution was added dropwise to methanol under stirring to precipitate a polymer, and the polymer was vacuum-dried to obtain a polyester resin 1. Table 11 shows structures and molar ratios of the produced polyesters.

TABLE 11

| Resin | Structure and ratio (molar ratio) of general formula (I) | Structure and ratio (molar ratio) of general formula (I) |
|---|---|---|
| Polyester resin 1 | (I-5)/(II-2) = 65/35 | (II-1)/(II-2) = 70/30 |
| Polyester resin 2 | (I-9)/(II-4) = 65/35 | (II-2)/(II-3) = 50/50 |
| Polyester resin 3 | (I-5)/(II-2) = 50/50 | (II-1)/(II-2) = 70/30 |

<Production Example of Photosensitive Member 1>

An aluminum cylinder having a diameter of 24 mm and a length of 257 mm was used as a support (electroconductive support).

[Electroconductive Layer]

Next, 100 parts of zinc oxide particle (specific surface area: 15 $\mu m^2/g$, average particle diameter: 70 nm, powder resistance: $3.7\times10^5$ Ω·cm) was stirred and mixed with 500 parts of toluene.

To this, 1.5 parts of N-(2-aminoethyl)-3 aminopropyltrimethoxysilane (trade name: KBM-603, manufactured by Shin-Etsu Chemical Co., Ltd.) as a silane coupling agent was added. The mixture was stirred for 6 hours.

Thereafter, toluene was distilled off under reduced pressure, and the mixture was heated and dried at 140° C. for 6 hours to obtain zinc oxide particle surface-treated with a silane coupling agent.

Next, 15 parts of a butyral resin (trade name: BM-1, manufactured by Sekisui Chemical Co., Ltd.) as a polyol resin and 15 parts of blocked isocyanate (trade name: Desmodur BL3175/1, manufactured by Sumika Bayer Urethane Co., Ltd.) were dissolved in a mixed solvent of 73.5 parts of methyl ethyl ketone and 73.5 parts of 1-butanol.

To this solution, 81 parts of the zinc oxide particle surface-treated with the silane coupling agent, 0.8 parts of 2,3,4-trihydroxybenzophenone (manufactured by Tokyo Chemical Industry Co., Ltd.), and 0.81 parts of zinc octylate (trade name: Nikka Octhix Zinc Zn 8%, manufactured by Nippon Chemical Industrial Co., Ltd.) were added, and the mixture was put in a sand mill using glass beads having a diameter of 0.8 mm and subjected to a dispersion treatment under an atmosphere of 23±3° C. for 3 hours.

After the dispersion treatment, 0.01 parts of silicone oil (trade name: SH 28 PA, manufactured by Dow Corning Toray Silicone Co., Ltd.) and 5.6 parts of silicone resin particle (trade name: Tospearl 145, manufactured by GE Toshiba Silicone Co., Ltd.) were added to this and stirred to prepare an electroconductive layer coating solution.

The coating solution for an electroconductive layer was dip-coated on the support, and the obtained coating film was dried and thermally cured at 150° C. for 30 minutes to form an electroconductive layer having a film thickness of 30 μm.

[Undercoat Layer]

Next, as a charge transporting substance, 8.5 parts of a compound represented by the following formula:

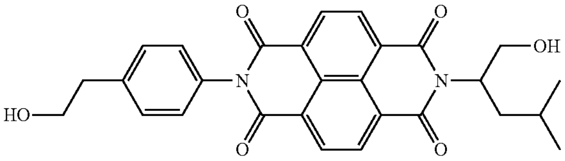

, 15 parts of the blocked isocyanate compound (trade name: SBN-70D, manufactured by Asahi Kasei Chemicals Corporation), 0.97 parts of a polyvinyl alcohol resin (trade name: KS-5Z, manufactured by Sekisui Chemical Co., Ltd.) as a resin, and 0.15 parts of zinc (II) hexanoate (trade name: Zinc hexanoate (II), manufactured by Mitsuwa Chemical Co., Ltd.) as a catalyst were dissolved in a mixed solvent of 88 parts of 1-methoxy-2 propanol and 88 parts of tetrahydrofuran.

To this solution, 1.8 parts of a silica slurry (product name: IPA-ST-UP, manufactured by Nissan Chemical Industries, Ltd., solid concentration: 15 mass %, viscosity: 9 mPa·s) dispersed in isopropyl alcohol and having an average primary particle diameter of 9-15 nm was added through a nylon screen mesh sheet (Product name: N-No. 150T) manufactured by Tokyo Screen Co., Ltd., and the mixture was stirred for 1 hour. Thereafter, pressure filtration was performed using a filter (product name: PF020) manufactured by ADVANTEC Corporation to prepare an undercoat layer coating liquid.

The undercoat layer coating solution was dip-coated on the electroconductive layer, and the obtained coating film was heated at 170° C. for 20 minutes and cured (polymerized) to form an undercoat layer having a film thickness of 0.7 μm on the electroconductive layer.

[Charge Generation Layer]

Next, 2 parts of polyvinyl butyral (trade name: S-LEC BX-1, manufactured by Sekisui Chemical Co., Ltd.) was dissolved in 100 parts of cyclohexanone.

To this solution, 4 parts of a hydroxygallium phthalocyanine crystal (charge generating substance) in a crystal form having strong peaks at 7.4° and 28.1° with a Bragg angle of 2θ±0.2° in CuKα characteristic X-ray diffraction was added.

This was placed in a sand mill using glass beads having a diameter of 1 mm, and dispersed for 1 hour under an atmosphere of 23±3° C. After the dispersion treatment, 100 parts of ethyl acetate was added thereto to prepare a charge generation layer coating liquid.

The charge generation layer coating liquid was dip-coated on the undercoat layer, and the obtained coating film was dried at 90° C. for 10 minutes to form a charge generation layer having a film thickness of 0.20 μm.

[Charge transport layer]

Next, 7.2 parts of a compound represented by Formula (CTM-1), 0.8 parts of a compound represented by Formula (CTM-2), and 10 parts of the polyester resin (1) synthesized in the production example of the polyester resin were dissolved in a mixed solution of 33 parts of dimethoxymethane, 15 parts of ortho-xylene, and 25 parts of methyl benzoate to prepare a charge transport layer coating liquid.

The charge transport layer coating liquid was dip-coated on the charge generation layer to form a coating film, and the obtained coating film was dried at 130° C. for 30 minutes to form a charge transport layer (surface layer) having a film thickness of 22 μm.

In this way, a photosensitive member 1 having the support, the electroconductive layer, the undercoat layer, the charge generation layer, and the charge transport layer in this order was produced. The evaluation results are shown in Table 12.

TABLE 12

| Photo-sensitive member No. | Type | Type of of resin particle | Volume average silica diameter [nm] | Mass ratio of particle silica particle/resin [%] | Martens hardness [N/mm$^2$] |
|---|---|---|---|---|---|
| 1 | Polyester resin 1 | — | — | — | 280 |
| 2 | Polyester resin 2 | — | — | — | 245 |
| 3 | Polyester resin 3 | RX50 | 40 | 10 | 298 |

<Production Examples of Photosensitive Members 2 and 3>

<Production Examples of Polyester Resins 2 and 3>

Polyester resins were produced in the same manner as in the production of the polyester resin 1, except that the types and amounts of the dicarboxylic acid halide and diol used were changed as shown in Table 10 in production examples of polyester resins. Table 11 shows the structures and molar ratios of the produced polyester resins.

<Production Example of Photosensitive Member 2>

A photosensitive member was produced in the same manner as in the production of the photosensitive member 1, except that the type of the polyester resin was changed as shown in Table 10. The details and evaluation results of the produced electrophotographic photosensitive member are shown in Table 12.

<Production Example of Photosensitive Member 3>

A photosensitive member 3 having a support, an electroconductive layer, an undercoat layer, a charge generation layer, and a charge transport layer in this order was produced in the same procedure as in the production of the photosensitive member 1 except that the method for preparing the charge transport layer was changed as follows and the type of the polyester resin was changed as shown in Table 10. The details and evaluation results of the produced electrophotographic photosensitive member are shown in Table 12.

[Charge Transport Layer]

Silica particle (trade name: RX 50, manufactured by Nippon Aerosil Co., Ltd.) (0.1 parts) was added to a solution of 9.9 parts of cyclopentanone, and dispersed over 2 hours using an ultrasonic disperser to obtain 10 parts of a silica dispersion.

Then, 7.2 parts of the compound represented by the formula (CTM-1), 0.8 parts of the compound represented by the formula (CTM-3), and 10 parts of the polyester resin (2) synthesized in the production example of the polyester resin were dissolved in a mixed solution of 40 parts of dimethoxymethane and 50 parts of cyclopentanone, and 10 parts of silica dispersion was added to prepare a charge transport layer coating liquid.

The charge transport layer coating liquid was dip-coated on the charge generation layer to form a coating film, and the obtained coating film was dried at 130° C. for 30 minutes to form a charge transport layer (surface layer) having a film thickness of 22 μm.

Example 1

Toner 1 was evaluated as follows. The evaluation results are shown in Table 13.

In the evaluation, a modified machine of LBP 712 Ci (manufactured by Canon Inc.) was used as an evaluation machine. A process speed of the main body was modified to 300 mm/sec. Then, necessary adjustment was performed to enable image formation under these conditions. In addition, the toner was removed from the black cartridge, and 300 g of the toner 1 was filled instead.

(Image Evaluation)

<Evaluation of Image Smearing>

Image smearing under a high temperature and high humidity environment (30° C./80% RH) was evaluated by the following method.

Canon Color Laser Copier paper (A4: 81.4 $g/m^2$, hereinafter, this paper was used unless otherwise specified) was used as evaluation paper.

After 10,000 sheets of paper were continuously fed daily at a printing rate of 1%, the sheets were left in the machine for one day, to make a comparison in terms of the occurrence of image smearing after the sheets were left. As an image sample, one halftone image was output and evaluated. Evaluation was performed every 10,000 sheets fed, and continued up to 30,000 sheets. The evaluation criteria are as follows.

(Evaluation Criteria)

A: No white spot or contour blurring at the image boundary portion occurs due to latent image rounding B: Slight contour blurring at the image boundary portion occurs in a part of the image due to latent image rounding C: White spot or contour blurring at the image boundary portion occurs in a part of the image due to latent image rounding D: White spot or contour blurring at the image boundary portion occurs in the entire area of the image due to latent image rounding <Evaluation of Drum Scratch>

After 10,000 sheets of paper were continuously fed daily at a printing rate of 1%, the sheets were left in the machine for one day, and a halftone image of (toner applied amount 0.25 $mg/cm^2$) was output and evaluated as an image sample. Evaluation was performed every 10,000 sheets fed, and continued up to 30,000 sheets. The evaluation criteria are as follows.

(Evaluation Criteria)

A: No vertical streak in the sheet ejection direction is observed on the image.

B: Several vertical streaks in the sheet ejection direction are observed on the image. A level at which the streaks can be erased by image processing.

C: Three or more vertical streaks in the sheet ejection direction are observed on the image. The streaks cannot be erased by image processing.

D: Vertical streaks are observed in half or more of the image. The streaks cannot be erased by image processing.

Examples 2 to 29 and Comparative Examples 1 to 7

Using the toners 1 to 20, the developing rollers 1 to 11, and the photosensitive members 1 to 3, the same image evaluation as in Example 1 was performed on the combinations shown in Table 13. The evaluation results are shown in Table 13.

TABLE 13

| | | Developing | Photosensitive | | Image smearing | | | Drum scratch | | |
|---|---|---|---|---|---|---|---|---|---|---|
| | Toner No. | roller No. | member No. | E1 × (H/100) × (1-S/100) | 10,000 sheets | 20,000 sheets | 30,000 sheets | 10,000 sheets | 20,000 sheets | 30,000 sheets |
| Example 1 | 1 | 1 | 1 | 13.7 | A | A | A | A | A | A |
| Example 2 | 2 | 1 | 1 | 8.4 | A | A | A | A | A | A |
| Example 3 | 3 | 1 | 1 | 17.5 | A | A | A | A | A | A |
| Example 4 | 4 | 1 | 1 | 7.9 | A | A | A | A | A | A |
| Example 5 | 5 | 1 | 1 | 30.2 | A | B | C | A | A | A |
| Example 6 | 6 | 1 | 1 | 17.3 | A | A | B | A | B | C |
| Example 7 | 7 | 1 | 1 | 4.5 | B | B | C | A | A | A |
| Example 8 | 8 | 1 | 1 | 27.7 | A | A | B | A | A | A |
| Example 9 | 9 | 1 | 1 | 41.1 | A | A | B | B | B | C |
| Example 10 | 10 | 1 | 1 | 7.1 | A | A | B | A | A | A |
| Example 11 | 11 | 1 | 1 | 12.4 | A | A | B | A | A | A |
| Example 12 | 12 | 1 | 1 | 8.0 | B | B | B | A | A | A |

TABLE 13-continued

| | Toner No. | Developing roller No. | Photosensitive member No. | E1 × (H/100) × (1-S/100) | Image smearing 10,000 sheets | Image smearing 20,000 sheets | Image smearing 30,000 sheets | Drum scratch 10,000 sheets | Drum scratch 20,000 sheets | Drum scratch 30,000 sheets |
|---|---|---|---|---|---|---|---|---|---|---|
| Example 13 | 13 | 1 | 1 | 9.2 | A | B | C | A | A | A |
| Example 14 | 2 | 2 | 1 | 5.0 | A | B | C | A | A | A |
| Example 15 | 2 | 3 | 1 | 5.3 | B | B | B | A | A | A |
| Example 16 | 2 | 4 | 1 | 8.9 | A | A | A | A | A | A |
| Example 17 | 2 | 5 | 1 | 103.2 | A | A | A | B | B | B |
| Example 18 | 8 | 5 | 1 | 340.6 | A | A | A | B | B | C |
| Example 19 | 2 | 6 | 1 | 7.2 | A | A | A | A | B | B |
| Example 20 | 9 | 6 | 1 | 35.3 | A | A | A | B | B | B |
| Example 21 | 2 | 1 | 2 | 8.4 | A | A | A | A | A | B |
| Example 22 | 2 | 1 | 3 | 8.4 | A | A | A | A | A | B |
| Example 23 | 7 | 2 | 1 | 2.7 | C | C | C | A | A | A |
| Example 24 | 9 | 6 | 1 | 505.3 | A | A | A | B | C | C |
| Example 25 | 14 | 2 | 1 | 4.7 | B | C | C | A | A | A |
| Example 26 | 15 | 2 | 1 | 7.4 | B | C | C | A | A | A |
| Example 27 | 16 | 2 | 1 | 4.4 | B | C | C | A | A | A |
| Example 28 | 17 | 2 | 1 | 5.6 | B | C | C | A | A | A |
| Example 29 | 9 | 7 | 1 | 47.0 | A | A | A | B | C | C |
| Comparative Example 1 | 2 | 8 | 1 | 0.5 | D | D | D | A | A | A |
| Comparative Example 2 | 2 | 9 | 1 | 0.5 | D | D | D | A | A | B |
| Comparative Example 3 | 2 | 10 | 1 | 96.0 | A | A | B | D | D | D |
| Comparative Example 4 | 2 | 11 | 1 | 168.0 | A | A | A | D | D | D |
| Comparative Example 5 | 18 | 1 | 1 | 13.5 | D | D | D | A | A | A |
| Comparative Example 6 | 19 | 1 | 1 | 6.0 | B | C | C | D | D | D |
| Comparative Example 7 | 20 | 1 | 1 | 2.8 | D | D | D | A | A | A |

[Consideration of Evaluation Results]

From the results of Examples 1 to 29, when the parameters for the toner, the developing roller, and the photosensitive member were within the ranges specified in the present invention, it was possible to achieve both the suppression of image smearing and the suppression of drum scratches.

In Comparative Examples 1 and 2, the developing rollers in which E1 and E2 had values lower than the ranges of the present invention were used. In this case, it is considered that, since the nitrogen oxide removing ability of the large-diameter silica particle was not exhibited, image smearing occurred from a time point of 10,000 sheets. In Comparative Example 5, the large-diameter silica particle having a major diameter smaller than the range of the present invention were used. It is considered that, since the silica particle did not act as a spacer, the nitrogen oxide could not be removed, and thus that image smearing occurred from the time point of 10,000 sheets. In Comparative Example 7, a toner in which the coverage of the large-diameter silica particle was lower than the range of the present invention was used. It is considered that image smearing occurred from the time point of 10,000 sheets due to the shortage of silica particle as the removing agent. In Comparative Examples 3 and 4, a developing roller having a value of E2 higher than the range of the present invention was used. It is considered that drum scratches occurred due to an excessive pressure for pressing the large-diameter silica particle against the surface of the photosensitive member. In Comparative Example 6, the large-diameter silica particle having a longer diameter than the range of the present invention were used. It is considered that, since the large-diameter silica particle was too large in major diameter as a spacer, the pressure at which the large-diameter silica particle pressed the surface of the photosensitive member was excessive, so that drum scratches occurred.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-162164, filed Sep. 28, 2020, which is hereby incorporated by reference herein in its entirety.

What is claimed is:

1. A process cartridge detachably attachable to an electrophotographic apparatus main body, the process cartridge comprising:

an electrophotographic photosensitive member;

a toner comprising a toner particle and an external additive A, the external additive A being a silica particle having a major diameter of 40 to 400 nm, with a coverage of the external additive A with respect to a surface of the toner particle being at least 3.0%; and a developing roller comprising an electroconductive substrate and a single-layered surface layer containing a binder resin on the substrate, wherein a surface layer of the electrophotographic photosensitive member has a Martens hardness of 245 to 300 $N/mm^2$ as measured with an indentation force of 7 mN, E1≥200 MPa and 10 MPa≤E2≤150 MPa, when E1 is an elastic modulus of the binder resin in a first region, the first region being a region from an outer surface of the single-layered surface layer to a depth of 0.1 μm, and E2 is an elastic modulus of the binder resin in a second region, the second region being a region from a depth of 1.0 to 1.1 μm from the outer surface as measured in a cross section in a thickness direction of the single-layered surface layer, and the elastic modulus in the second region continuously decreases from that in the first region.

2. The process cartridge according to claim 1, wherein 3.0<E1×(H/100)×(1-S/100)<400.0 is satisfied, when H % is the coverage of the external additive A with respect to the surface of the toner particle is H %, and S % is a fixation rate of the external additive A obtained by SEM observation of the toner.

3. The process cartridge according to claim 1, wherein the toner contains an external additive B, external additive B being a silica particle having a major diameter of 5 to 40 nm, and a coverage of a combination of the external additive A and the external additive B with respect to the surface of the toner particle is 62 to 100%.

4. The process cartridge according to claim 3, wherein a fixation rate of the external additive B is at least 70%.

5. The process cartridge according to claim 1, wherein the external additive A has a dispersity evaluation index of 0.5 to 2.0.

6. The process cartridge according to claim 1, wherein (E1-E3)/E3>1 when E3 is an elastic modulus of the binder resin in a third region, the third region being a region from a depth of 0.5 to 0.6 μm from the outer surface of the surface layer as measured in the cross section in the thickness direction of the surface layer.

7. The process cartridge according to claim 1, wherein the single-layered surface layer comprises a crosslinked urethane resin as the binder resin.

* * * * *